June 23, 1953  J. GILCHRIST  2,642,786
APPARATUS FOR FORMING AND ASSEMBLING EGG CARTONS
Filed Nov. 26, 1949  27 Sheets-Sheet 1
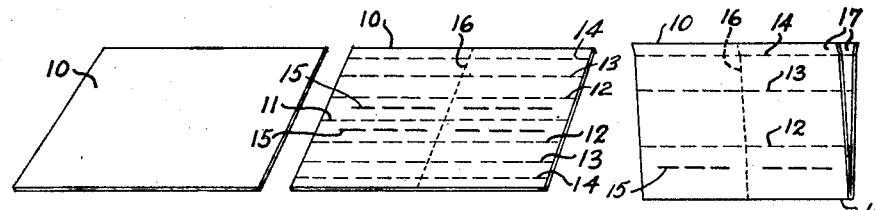
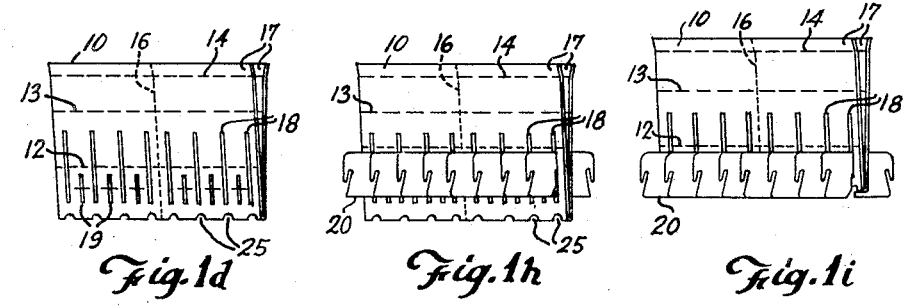
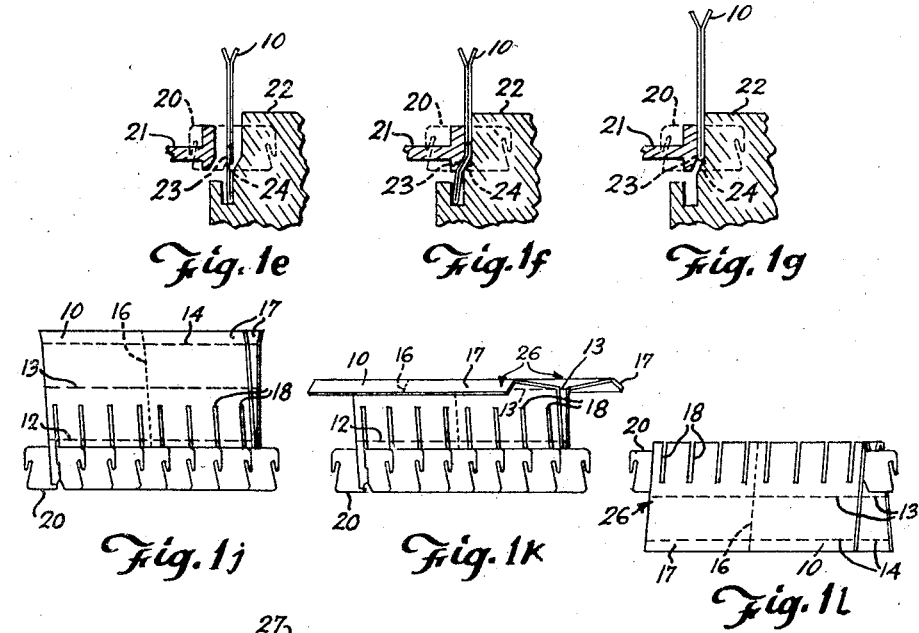
INVENTOR
JOHN GILCHRIST
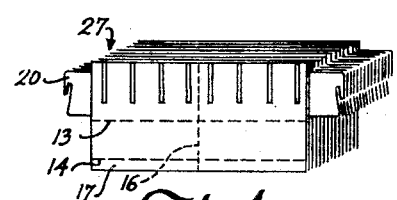
ATT'YS

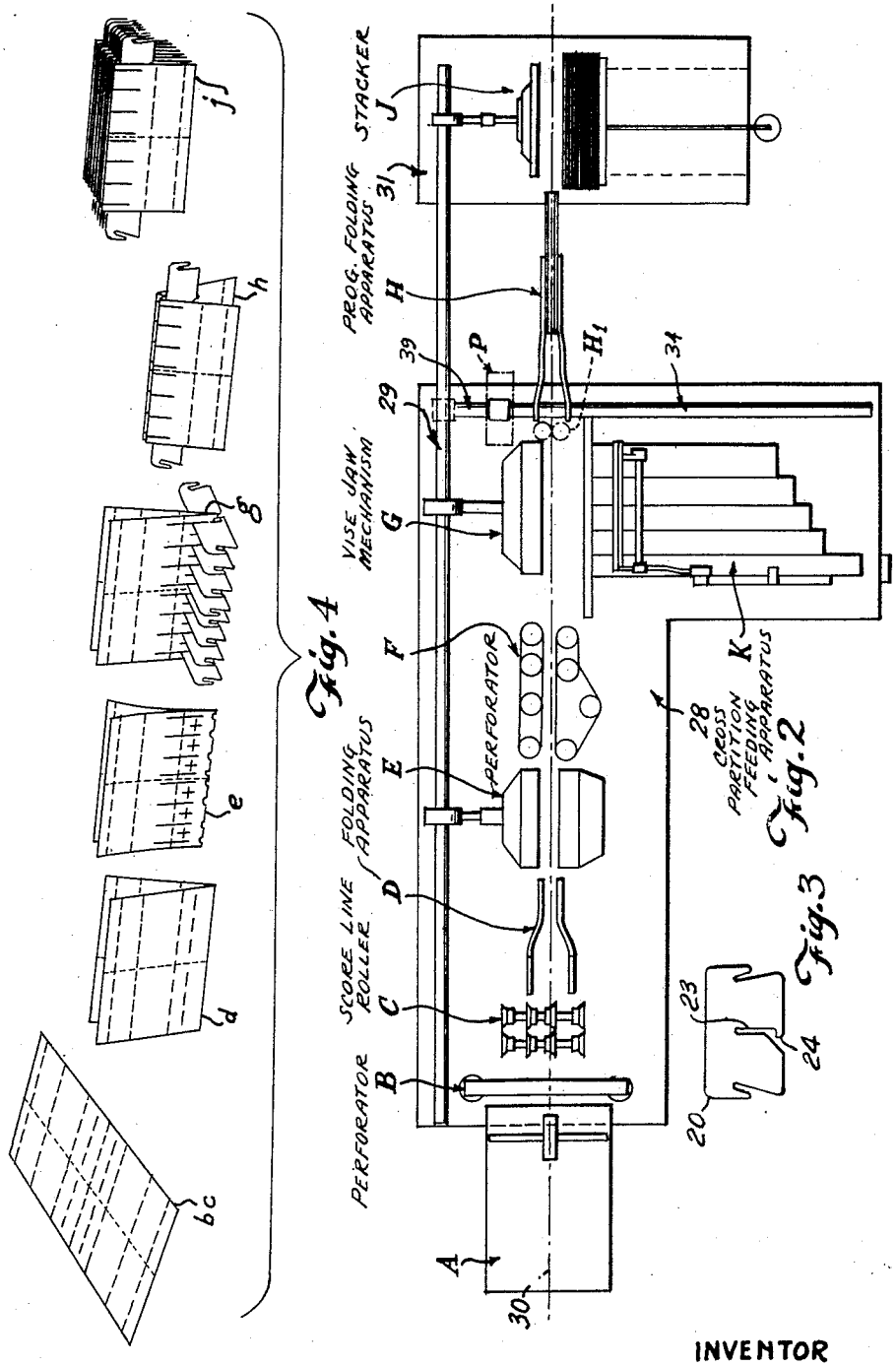

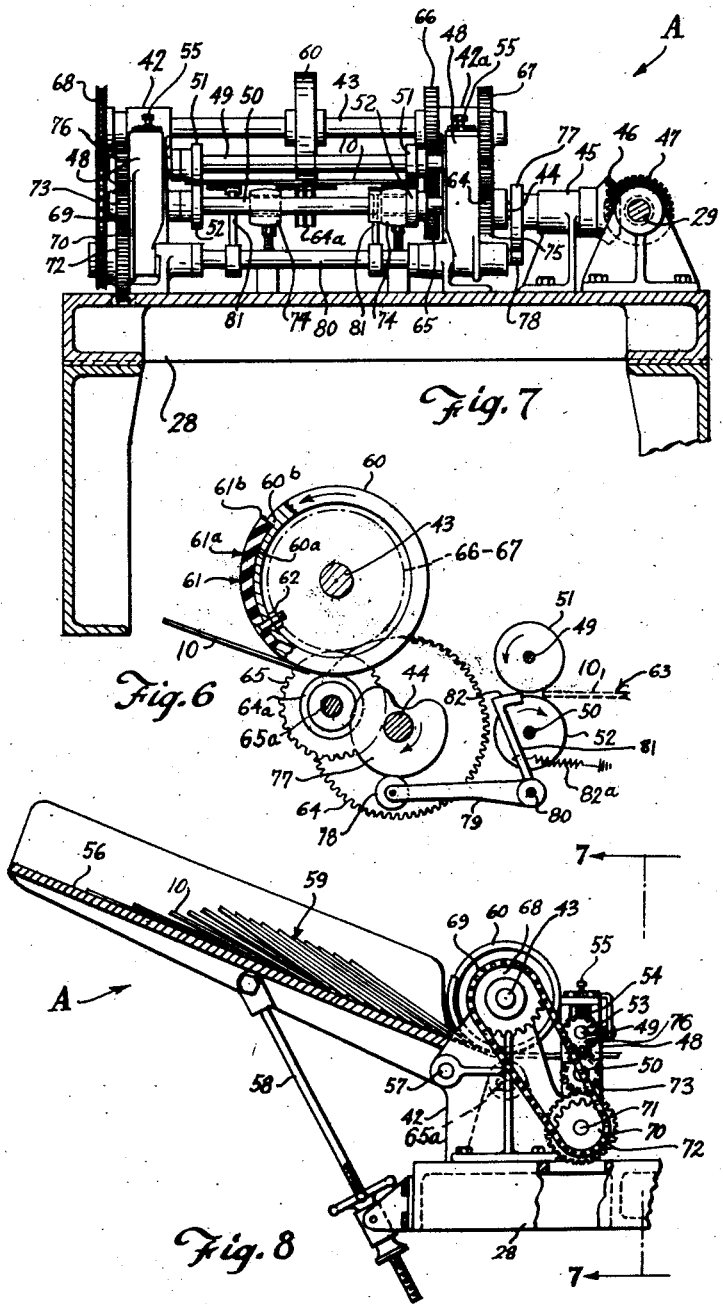

June 23, 1953  J. GILCHRIST  2,642,786
APPARATUS FOR FORMING AND ASSEMBLING EGG CARTONS
Filed Nov. 26, 1949  27 Sheets-Sheet 6
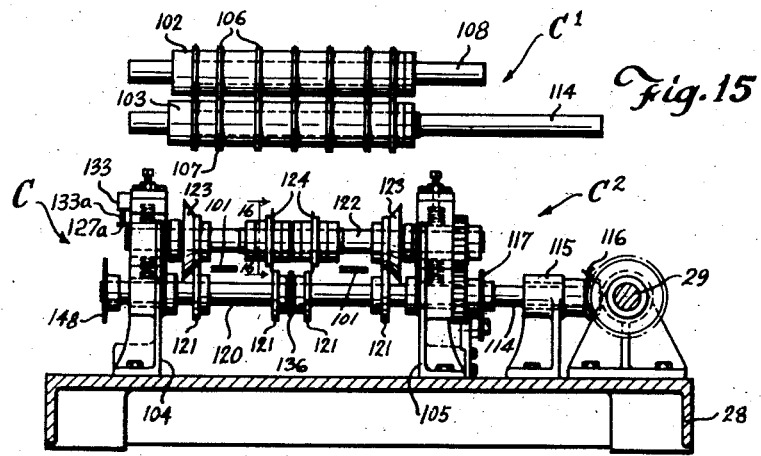
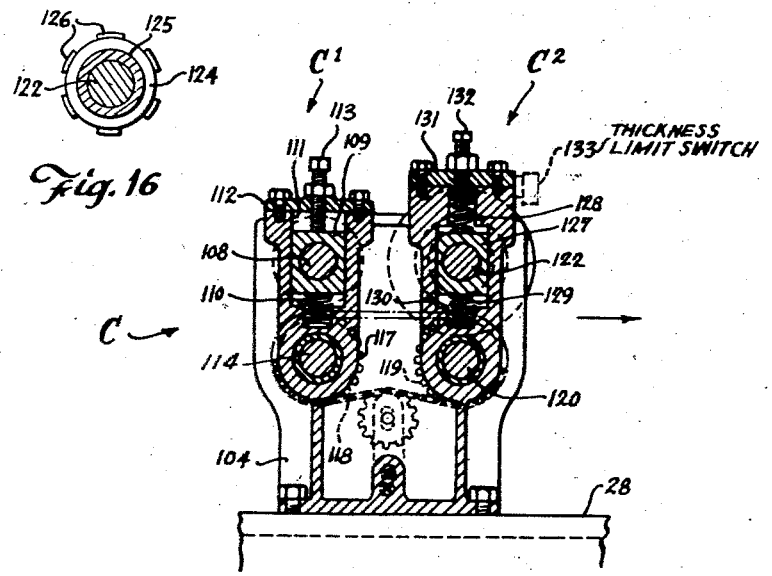
INVENTOR
JOHN GILCHRIST
ATT'YS June 23, 1953   J. GILCHRIST   2,642,786
APPARATUS FOR FORMING AND ASSEMBLING EGG CARTONS
Filed Nov. 26, 1949   27 Sheets-Sheet 8

INVENTOR
JOHN GILCHRIST
By: Fetherstonhaugh & Co.
ATT'YS

June 23, 1953  J. GILCHRIST  2,642,786
APPARATUS FOR FORMING AND ASSEMBLING EGG CARTONS
Filed Nov. 26, 1949  27 Sheets-Sheet 11

INVENTOR
JOHN GILCHRIST
By: Fetherstonhaugh & Co.
ATT'YS

June 23, 1953    J. GILCHRIST    2,642,786
APPARATUS FOR FORMING AND ASSEMBLING EGG CARTONS
Filed Nov. 26, 1949    27 Sheets-Sheet 12

INVENTOR
JOHN GILCHRIST
By: Fetherstonhaugh & Co.
ATT'YS

June 23, 1953    J. GILCHRIST    2,642,786
APPARATUS FOR FORMING AND ASSEMBLING EGG CARTONS
Filed Nov. 26, 1949    27 Sheets-Sheet 13

INVENTOR
JOHN GILCHRIST
By: Fetherstonhaugh & Co.
ATT'YS

June 23, 1953  J. GILCHRIST  2,642,786
APPARATUS FOR FORMING AND ASSEMBLING EGG CARTONS
Filed Nov. 26, 1949  27 Sheets-Sheet 14

INVENTOR
JOHN GILCHRIST
By: Featherstonhaugh & Co.
ATT'YS

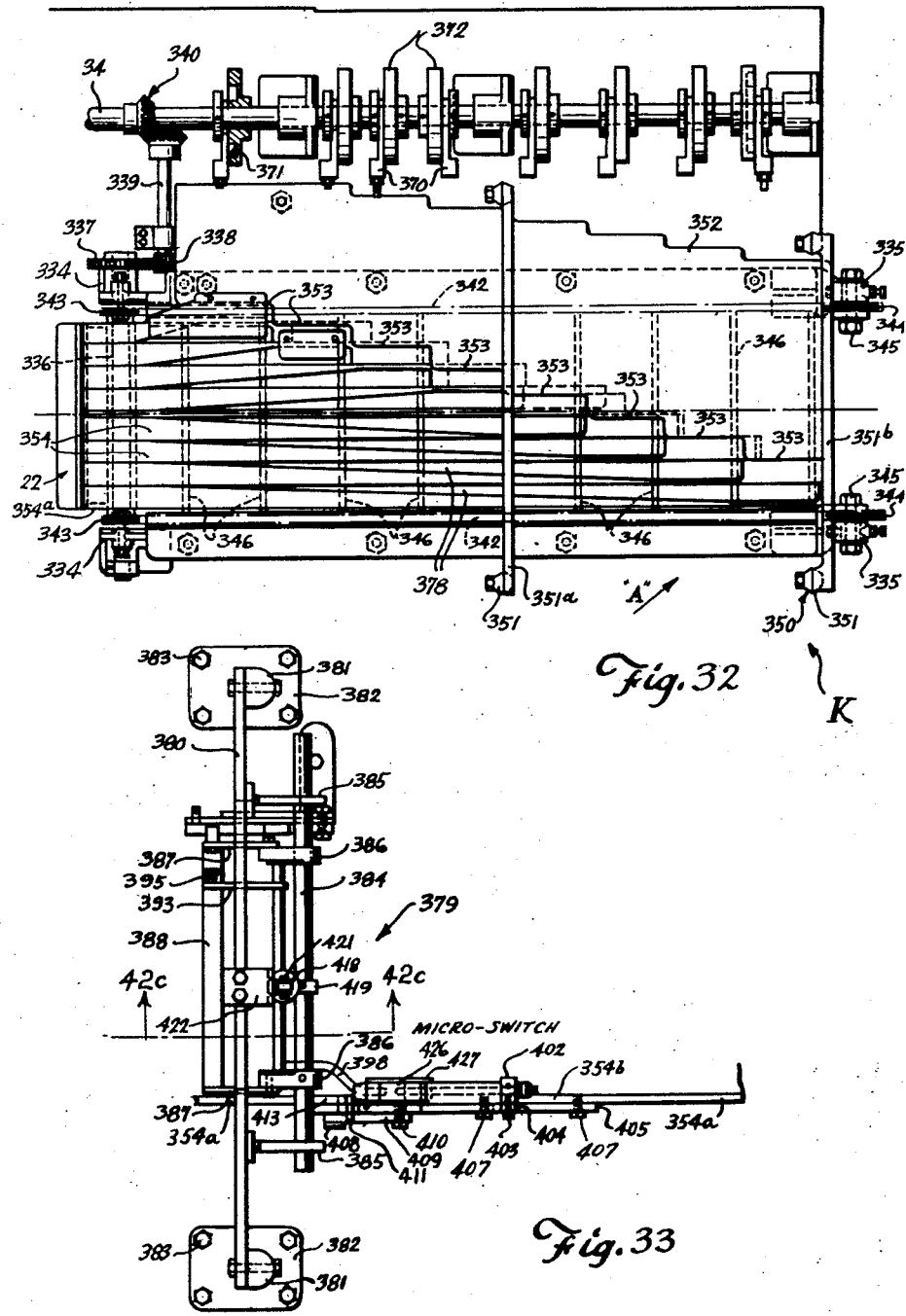

June 23, 1953 J. GILCHRIST 2,642,786
APPARATUS FOR FORMING AND ASSEMBLING EGG CARTONS
Filed Nov. 26, 1949 27 Sheets-Sheet 16

INVENTOR
JOHN GILCHRIST
By: Fetherstonhaugh & Co.
ATT'YS

June 23, 1953 J. GILCHRIST 2,642,786
APPARATUS FOR FORMING AND ASSEMBLING EGG CARTONS
Filed Nov. 26, 1949 27 Sheets-Sheet 17
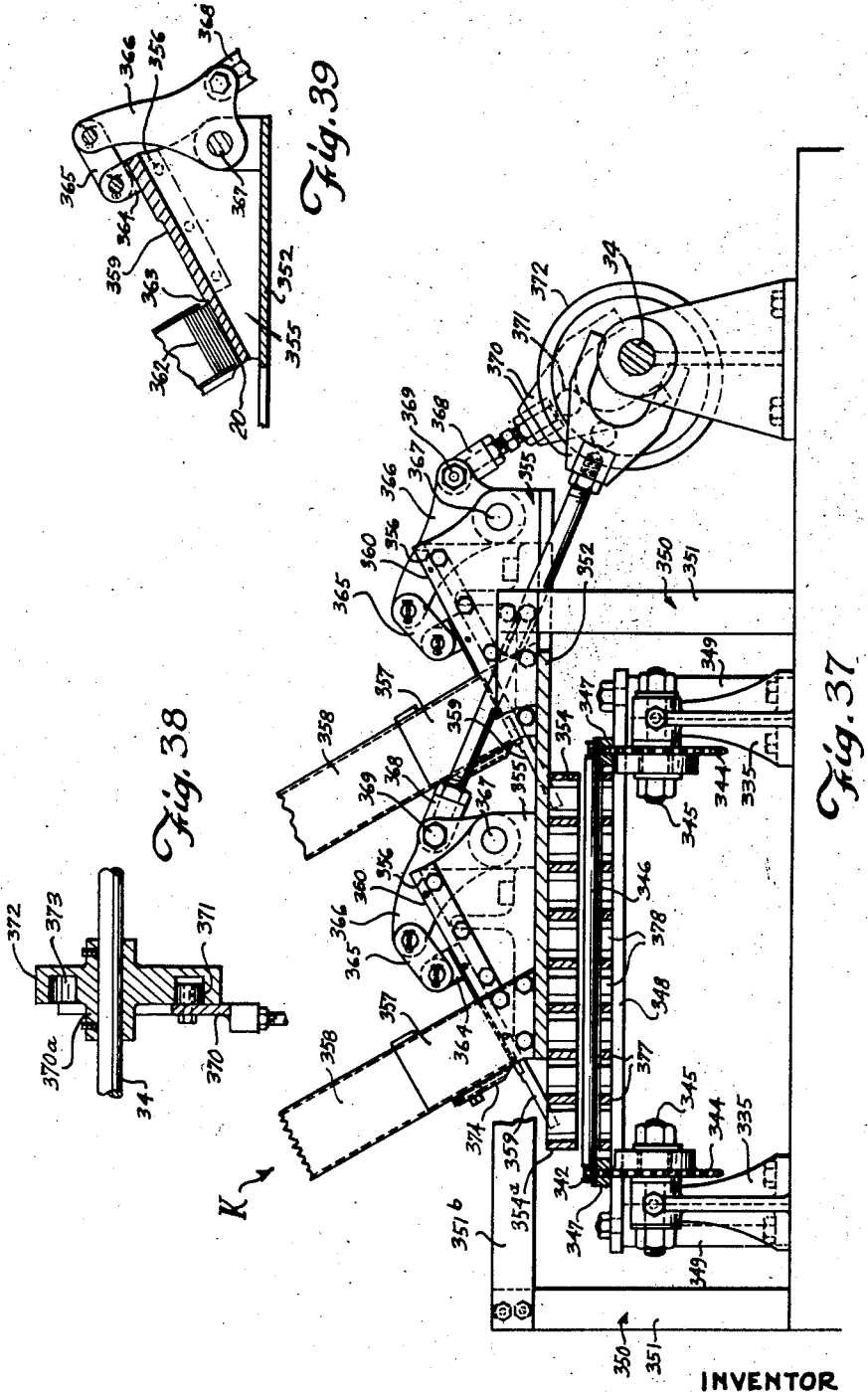
INVENTOR
JOHN GILCHRIST
By: Fetherstonhaugh & Co.
ATT'YS June 23, 1953   J. GILCHRIST   2,642,786
APPARATUS FOR FORMING AND ASSEMBLING EGG CARTONS
Filed Nov. 26, 1949   27 Sheets-Sheet 18
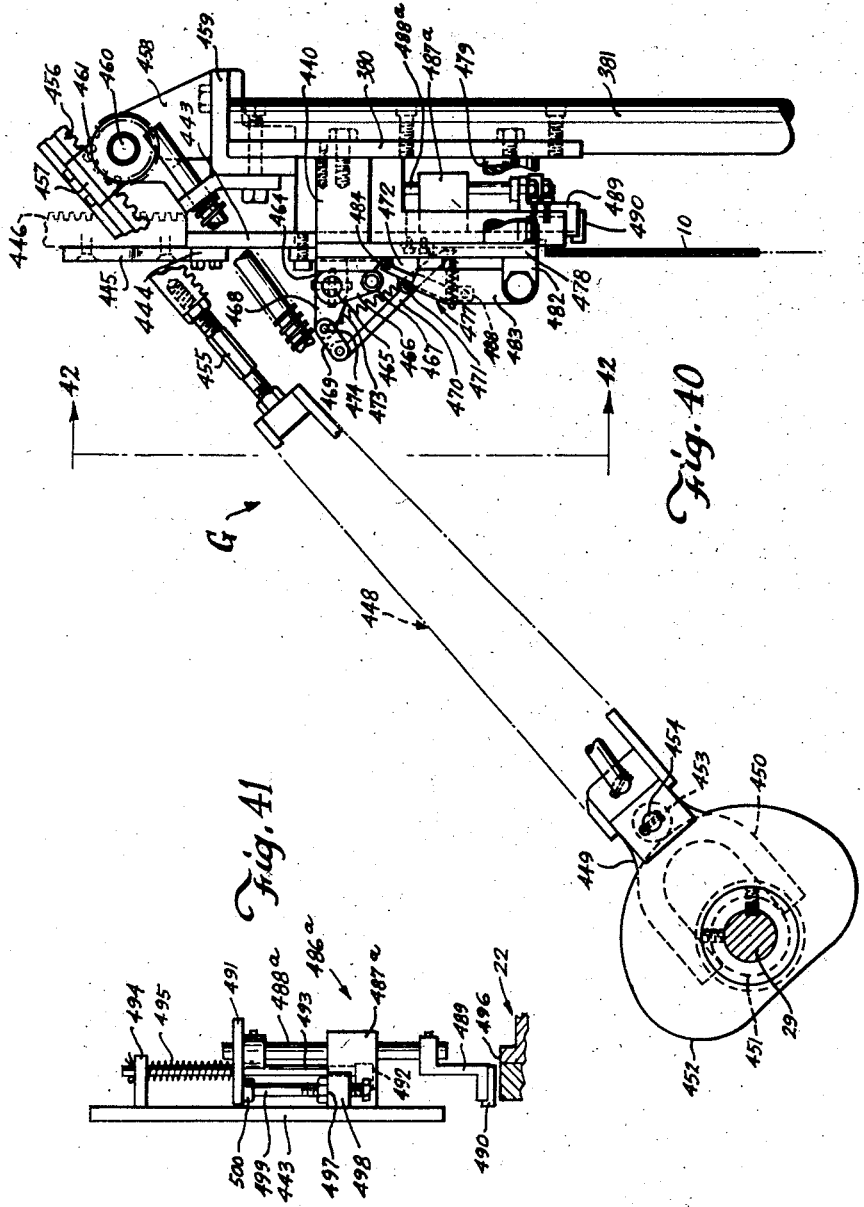
INVENTOR
JOHN GILCHRIST
By: Fetherstonhaugh & Co.
ATT'YS June 23, 1953  J. GILCHRIST  2,642,786
APPARATUS FOR FORMING AND ASSEMBLING EGG CARTONS
Filed Nov. 26, 1949  27 Sheets-Sheet 19
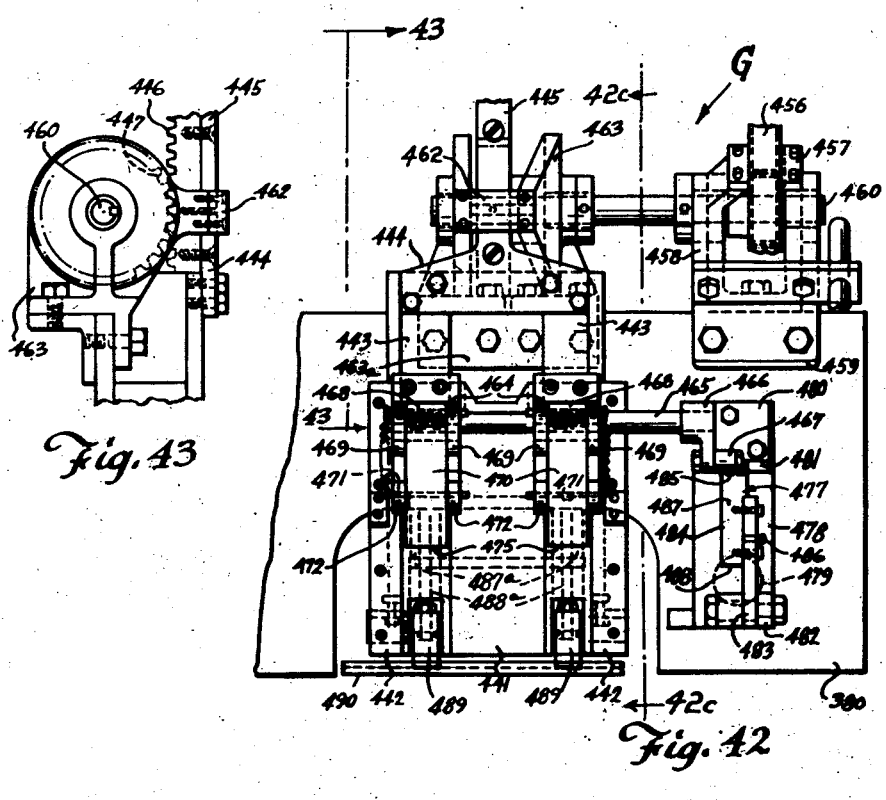
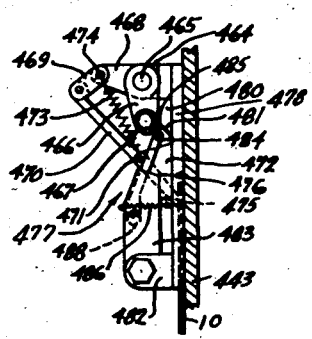
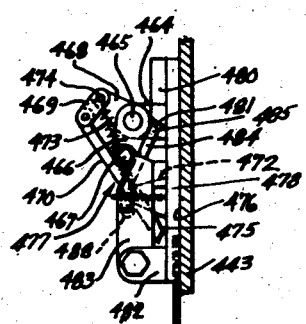
INVENTOR
JOHN GILCHRIST

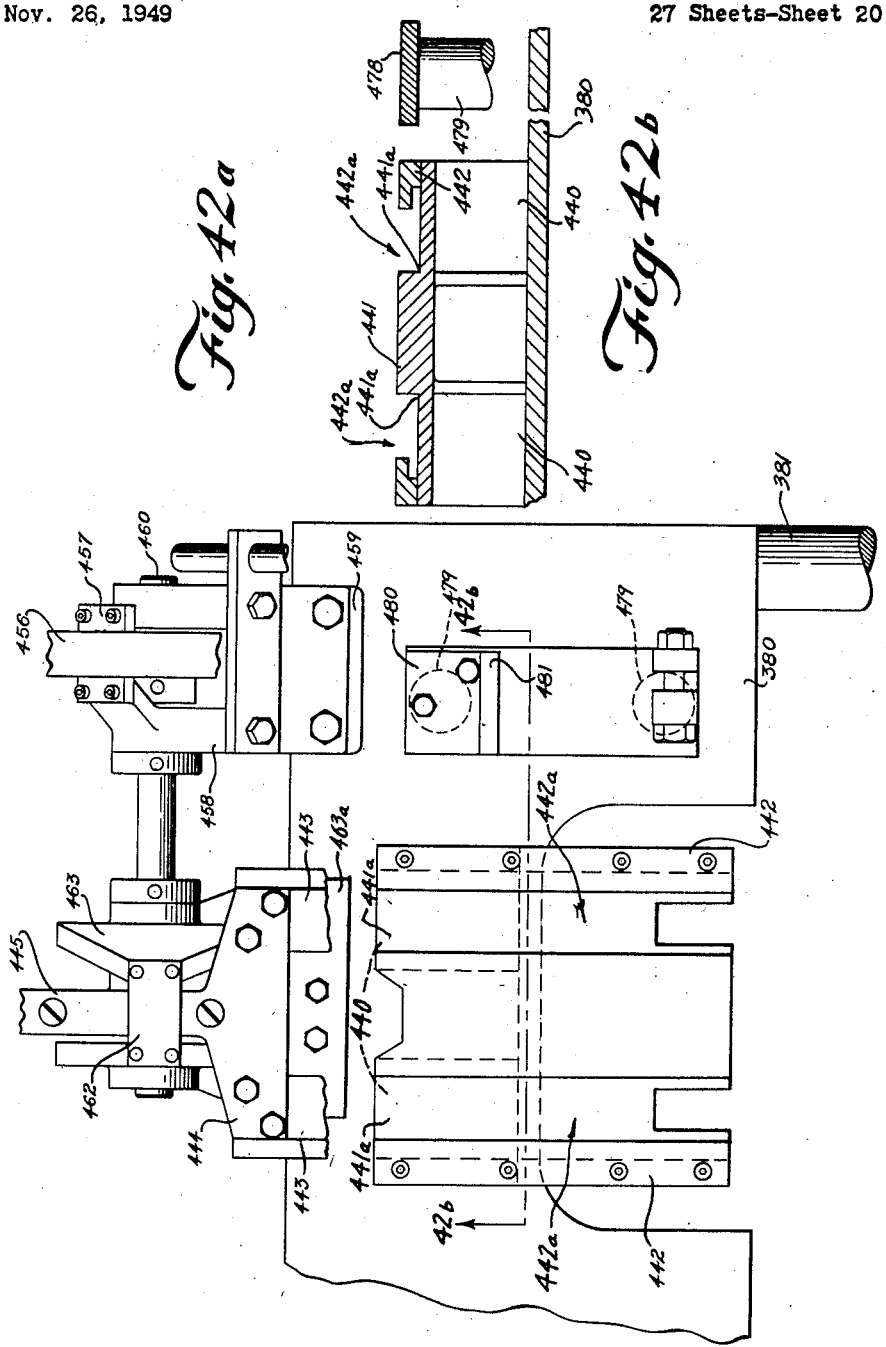

June 23, 1953   J. GILCHRIST   2,642,786
APPARATUS FOR FORMING AND ASSEMBLING EGG CARTONS
Filed Nov. 26, 1949   27 Sheets-Sheet 21
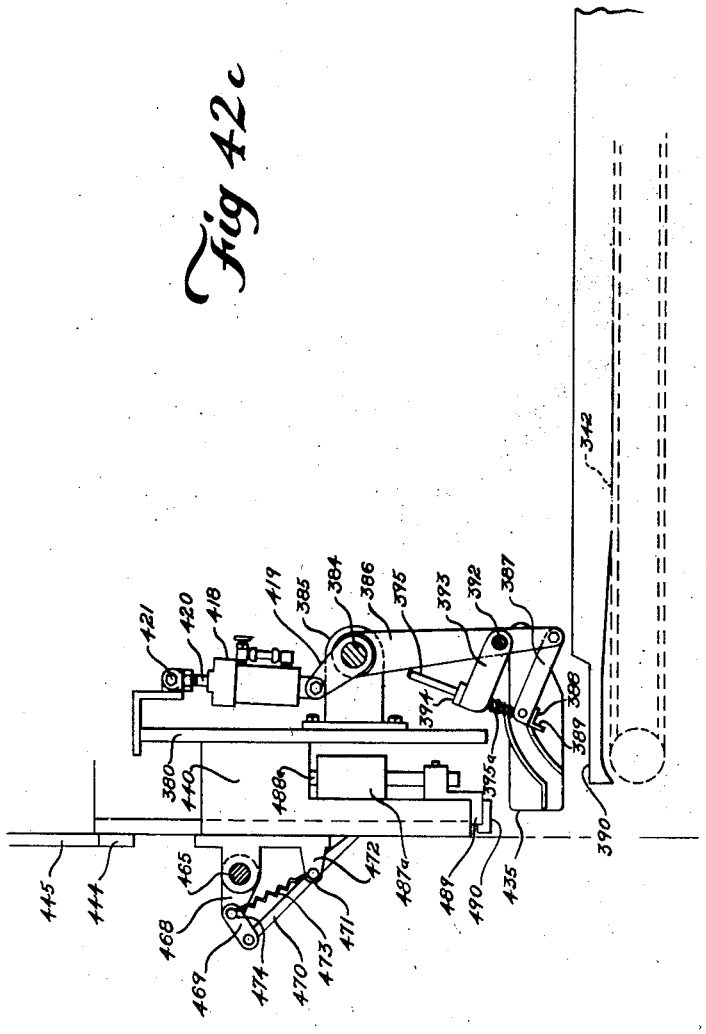
INVENTOR
JOHN GILCHRIST
By Fetherstonhaugh+Co.
ATT'YS June 23, 1953  J. GILCHRIST  2,642,786
APPARATUS FOR FORMING AND ASSEMBLING EGG CARTONS
Filed Nov. 26, 1949  27 Sheets-Sheet 22

INVENTOR
JOHN GILCHRIST
By: Fetherstonhaugh & Co.
ATT'YS

June 23, 1953  J. GILCHRIST  2,642,786
APPARATUS FOR FORMING AND ASSEMBLING EGG CARTONS
Filed Nov. 26, 1949  27 Sheets-Sheet 23
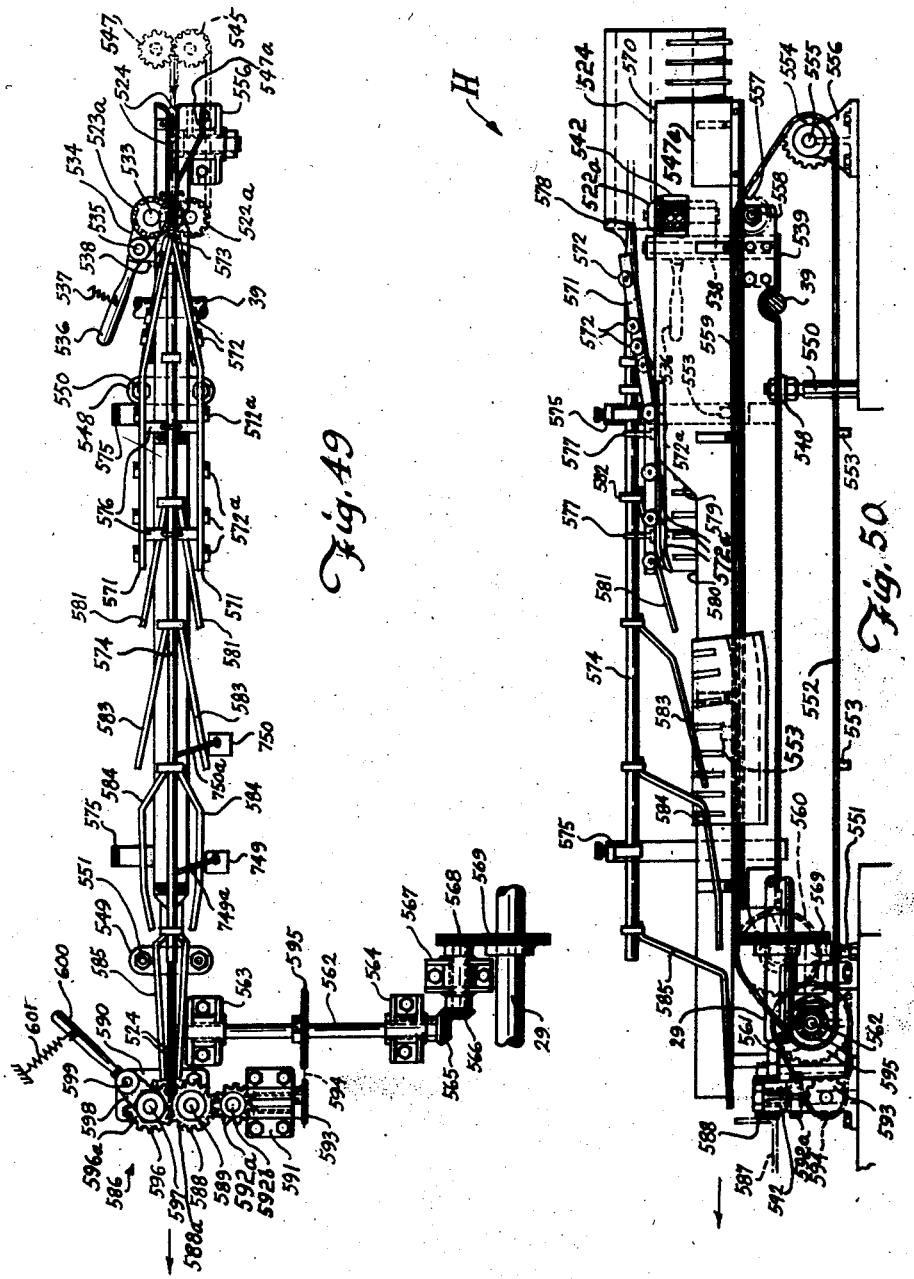
INVENTOR
JOHN GILCHRIST
By: Fetherstonhaugh & Co.
ATT'YS

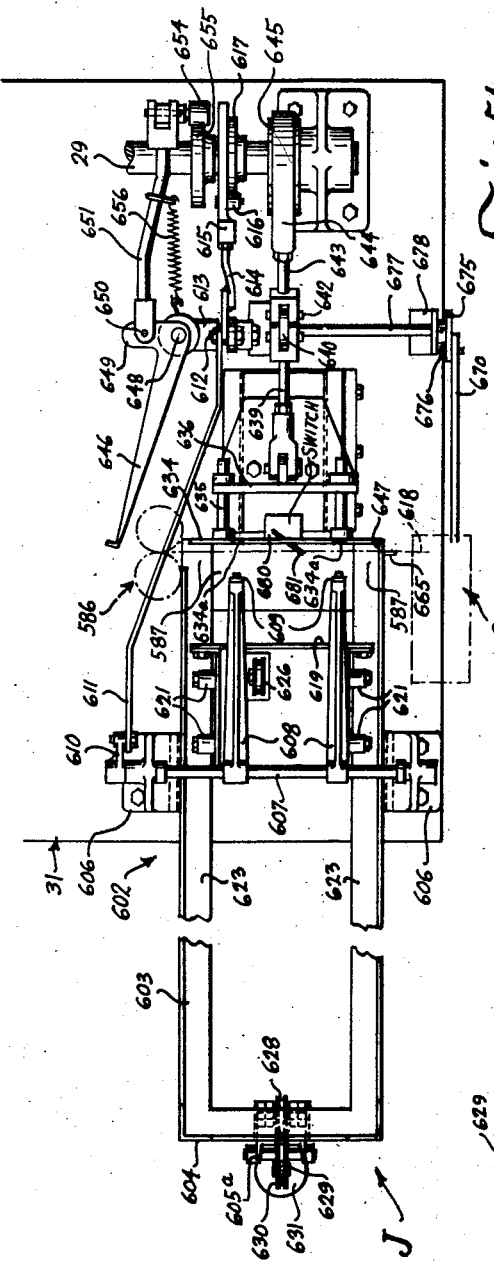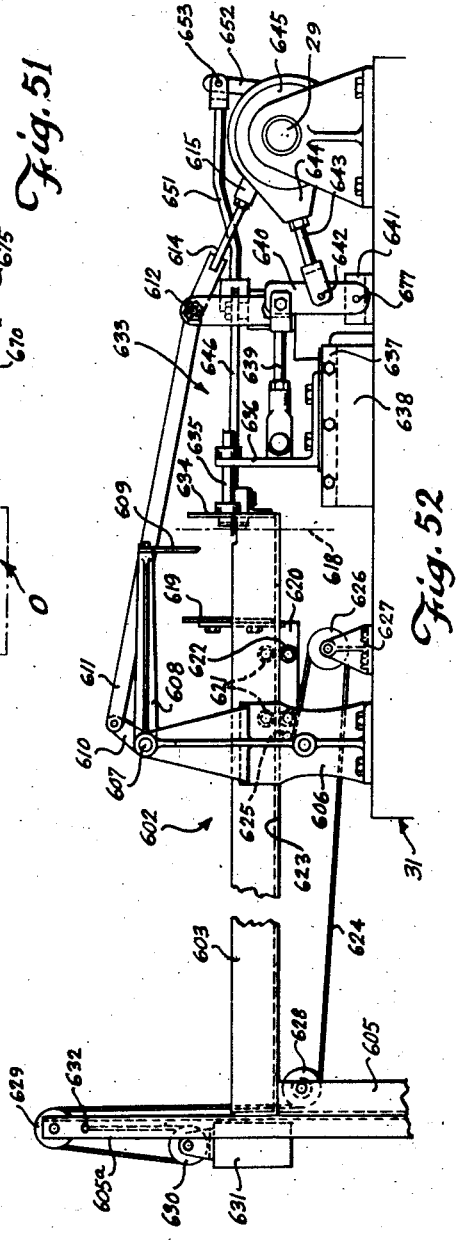

June 23, 1953  J. GILCHRIST  2,642,786
APPARATUS FOR FORMING AND ASSEMBLING EGG CARTONS
Filed Nov. 26, 1949  27 Sheets-Sheet 25
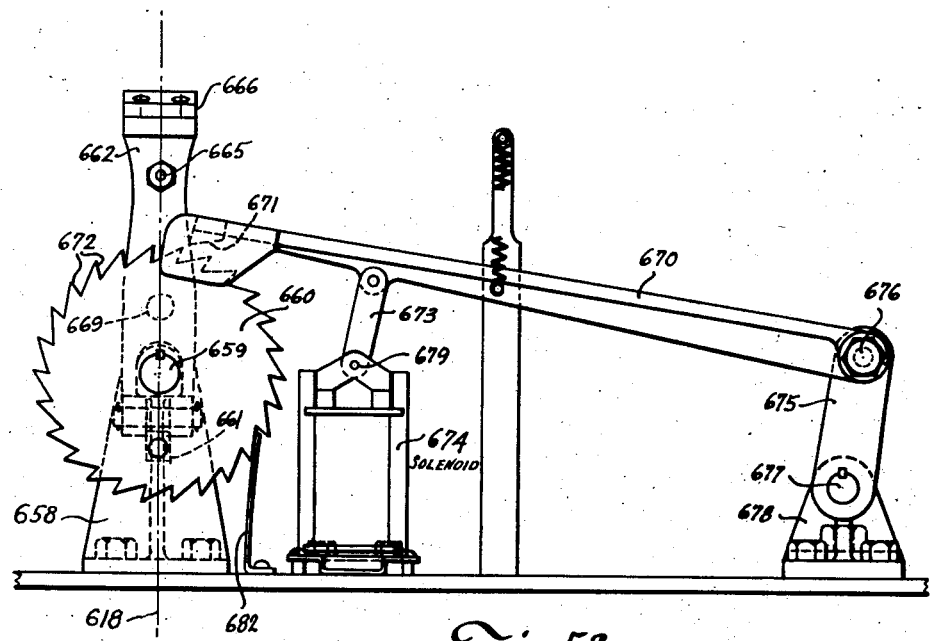
Fig. 53
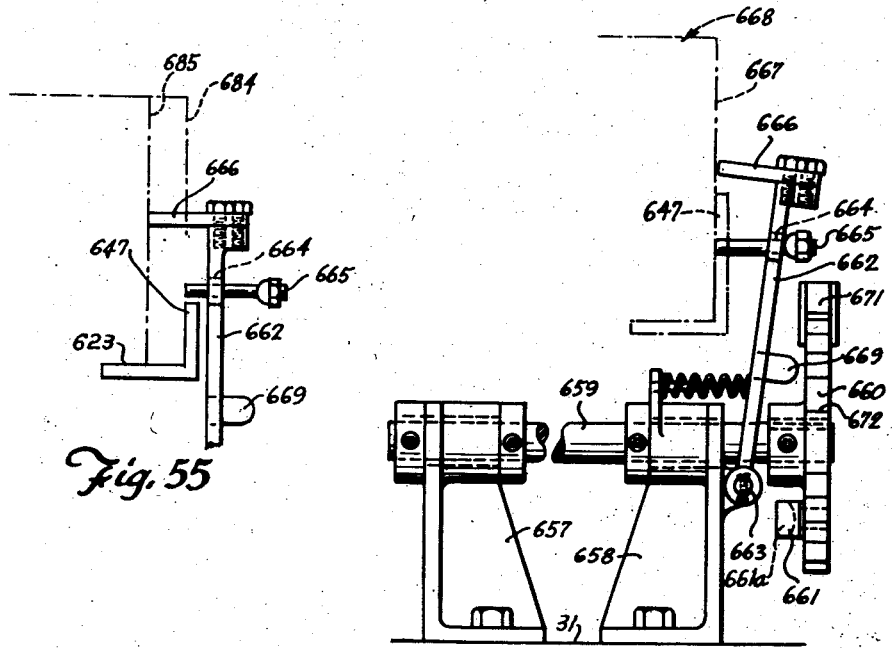
Fig. 55
Fig. 54
INVENTOR
JOHN GILCHRIST
By: Featherstonhaugh & Co.
ATT'YS June 23, 1953   J. GILCHRIST   2,642,786
APPARATUS FOR FORMING AND ASSEMBLING EGG CARTONS
Filed Nov. 26, 1949   27 Sheets-Sheet 26

INVENTOR
JOHN GILCHRIST
By: Fetherstonhaugh & Co.
ATT'YS

June 23, 1953  J. GILCHRIST  2,642,786
APPARATUS FOR FORMING AND ASSEMBLING EGG CARTONS
Filed Nov. 26, 1949  27 Sheets-Sheet 27

INVENTOR
JOHN GILCHRIST
By: Featherstonhaugh & Co.
ATT'YS

Patented June 23, 1953

2,642,786

UNITED STATES PATENT OFFICE 2,642,786

APPARATUS FOR FORMING AND ASSEMBLING EGG CARTONS

John Gilchrist, London, Ontario, Canada, assignor, by mesne assignments, to Robert Gair Company, Inc., New York, N. Y., a company of Delaware Application November 26, 1949, Serial No. 129,611
In Canada December 7, 1948

24 Claims. (Cl. 93—37)

This invention relates to apparatus for forming and assembling an egg carton.

The apparatus of the present invention is intended for use in assembling egg cartons of a design which when set up provides a pair of closing flaps adapted to be folded over two parallel rows of compartments and wherein these rows are separated by a medial double wall partition in conjunction with the closing flaps.

In order to construct a carton of this character, it is usual to form the carton body from a single blank of paper board and to insert separate cross partitions or walls through slots therein so that each cross partition serves to separate the compartments on opposite sides of the medial partition. Cartons of this general character are known and have been used for some time.

In shipping cartons of this type in knocked-down form it is usual to dispose the cross walls in overlapping or flatwise relation with respect to the medially folded carton blank and to turn down the upper portions of the walls of the blank over the cross walls so that a minimum of space will be taken up by the carton in knocked-down form during shipment.

It is an object of the invention to provide improved apparatus for forming and assembling egg cartons and more particularly for inserting the cross partitions into a medially folded carton blank wherein the blank is supported in a vise while a series of cross partitions are fed transversely and simultaneously thereinto from a plurality of cross partition guideways fed by a plurality of cross partition magazines and including means for continuously conveying the cross partitions through the guideways to the carton blank in the vice.

It is another object of the invention to provide apparatus for inserting cross partitions into a medially folded carton blank as described, including electrical control means whereby the feeding of cross partitions to the vice is dependent upon the presence of a medially folded carton blank within the vice jaw mechanism and also including control means whereby a fouling or jamming of cross partitions while the same are being inserted into the carton blank, effects an immediate stoppage of the whole apparatus.

With the foregoing and other objects in view, the invention will be appreciated in more detail by reference to the specification, taken in conjunction with the accompanying drawings.

In the drawings:

Figures 1a to 1m inclusive illustrate the successive operations involved in forming and assembling an egg carton in a knocked-down form and illustrating in the last of these figures a plurality of assembled cartons in stacked relationship.

Figure 2 is a diagrammatic plan view of the complete apparatus showing the location of a series of units which may be utilized for forming cartons of the twin type according to the method herein, the carton being of the type which may be broken into two portions each including parallel rows of three eggs each.

Figure 3 is a detail of one of the cross partitions.

Figure 4 is a diagrammatic view of the operations carried out by the apparatus of Figure 2 located in the drawing in positions corresponding to the components carrying out the illustrated operations.

Figures 6 to 8 illustrate the carton blank feeding mechanism; Figure 6 being a diagrammatic showing of its components; Figure 7 a vertical sectional view on the line 7—7 of Figure 8; and Figure 8 a side elevation partly in section.

Figure 9:
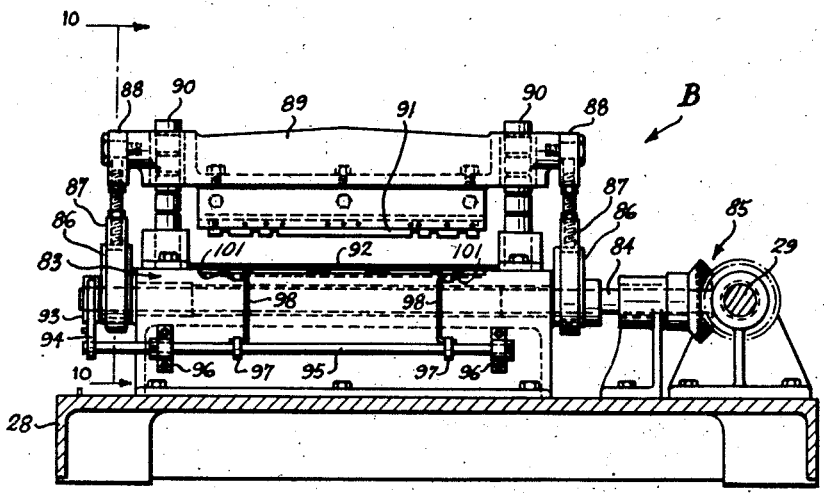
Figure 11:
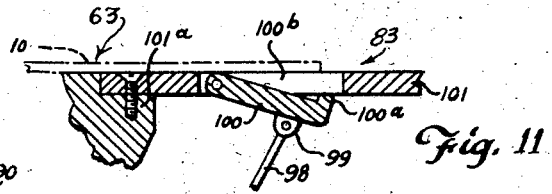
Figure 10:
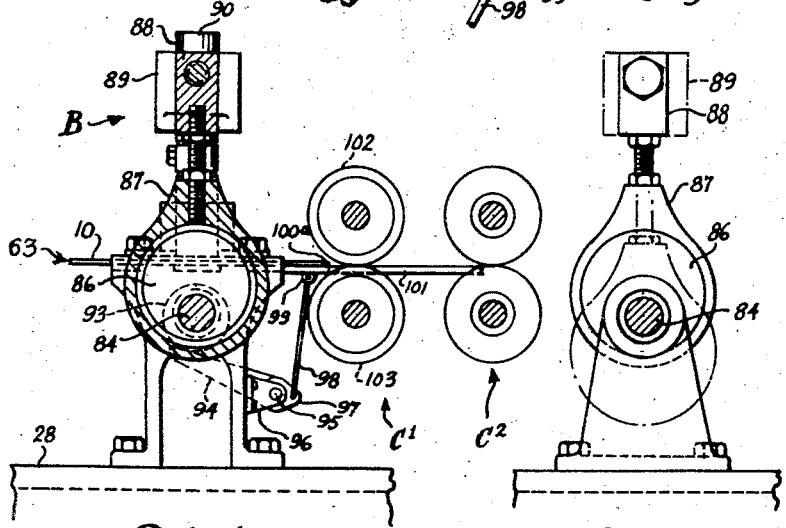
Figure 12:
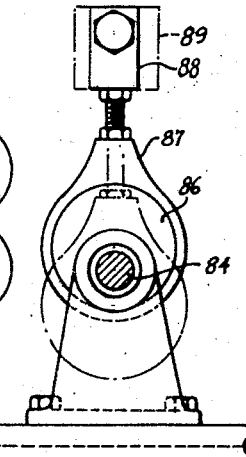

Figure 9 is a view in elevation of the perforating unit B looking toward the unit A; Figure 10 is an enlarged section taken at the line 10—10 of Figure 9; Figure 11 is a detail illustrating an automatic carton blank stop; and Figure 12 is a partially diagrammatic illustration of the mode of operation of the eccentric drive of the perforated cross-head.

Figure 13 is a sectional view of the creasing and cutting unit C comprising the subcomponents C1 and C2 which function respectively to crease and cut the carton blanks.

Figures 14 to 16 illustrate the unit C wherein Figure 14 is a view of the unit C looking toward the unit A; Figure 15 is a view of the creasing rollers of the subcomponent C2; Figure 16 is a sectional view along the line 16—16 of Figure 14.

Figure 17:
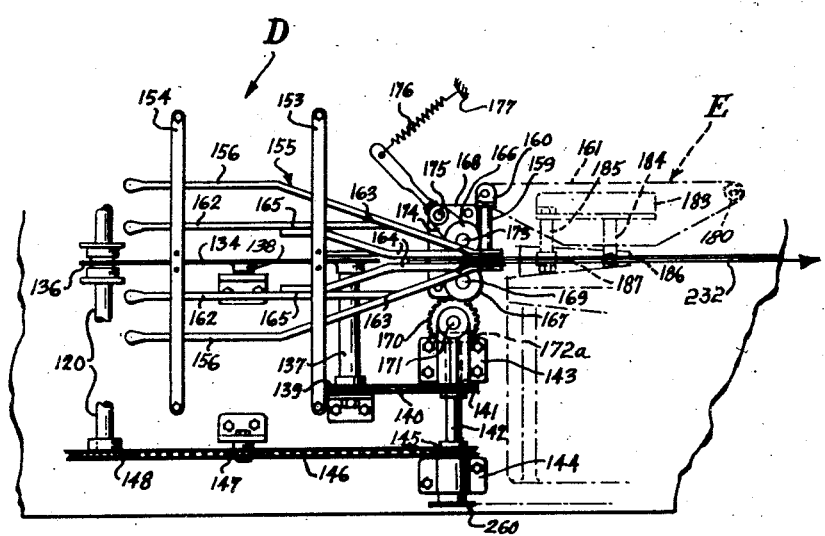

Figure 17 is a plan view of the medial line folding unit D showing portions of the unit E in chain lines.

Figure 18:
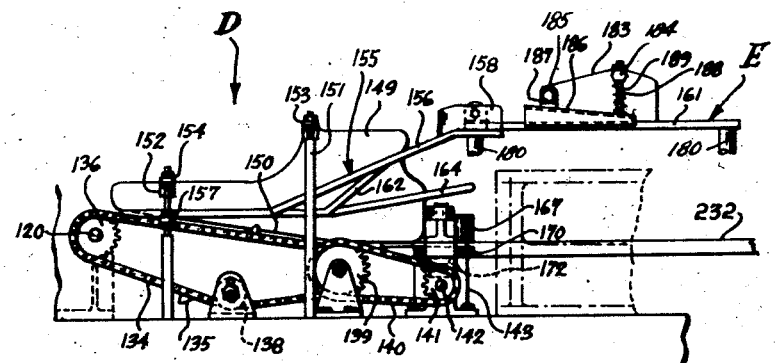

Figure 18 is an elevation of the apparatus of Figure 17 wherein certain components are omitted for purposes of clarity.

Figure 19:
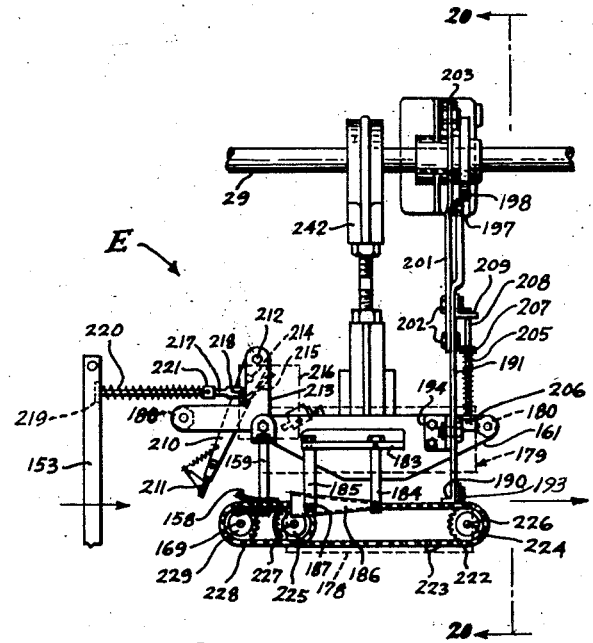

Figure 19 is a plan view illustrating the carton blank transfer mechanism associated with the slotter E, the latter being shown only fragmentarily.

Figure 20:
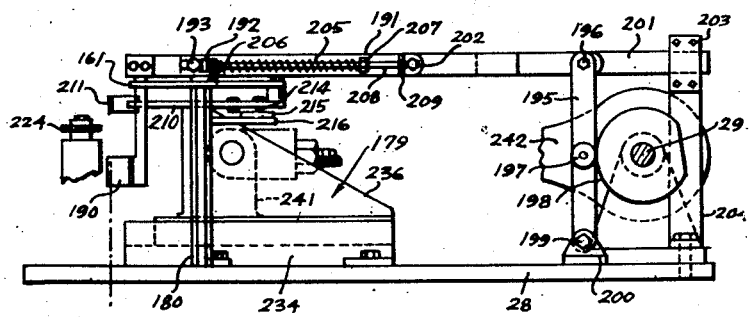

Figure 20 is an elevational view taken on the line 20—20 of Figure 19, the slotter being shown only fragmentarily.

Figure 21:
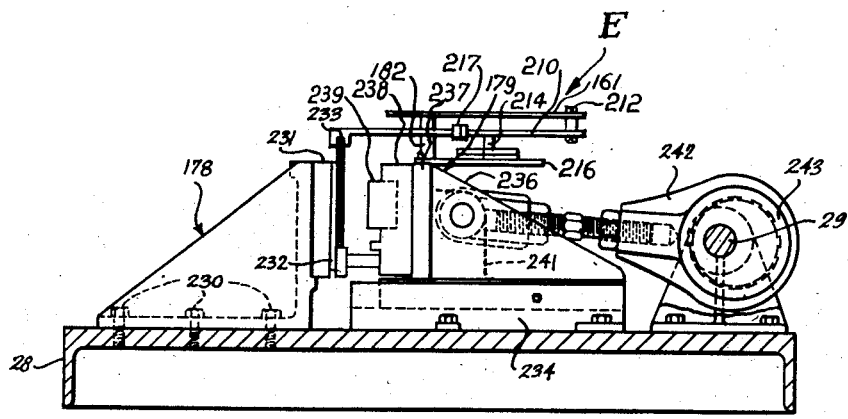

Figure 21 is an elevational view of the slotter unit E from which the transfer mechanism of Figures 19 and 20 has been omitted for purposes of clarity.

Figure 22:
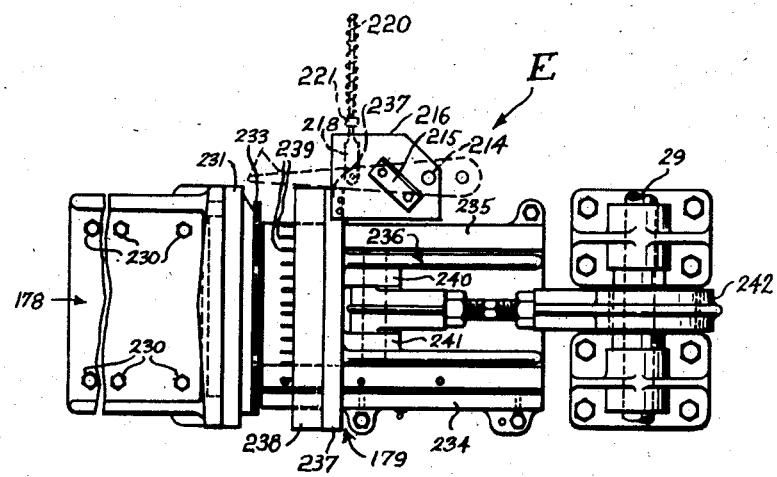

Figure 22 is a plan view of the apparatus illustrated in Figure 21.

Figure 23:
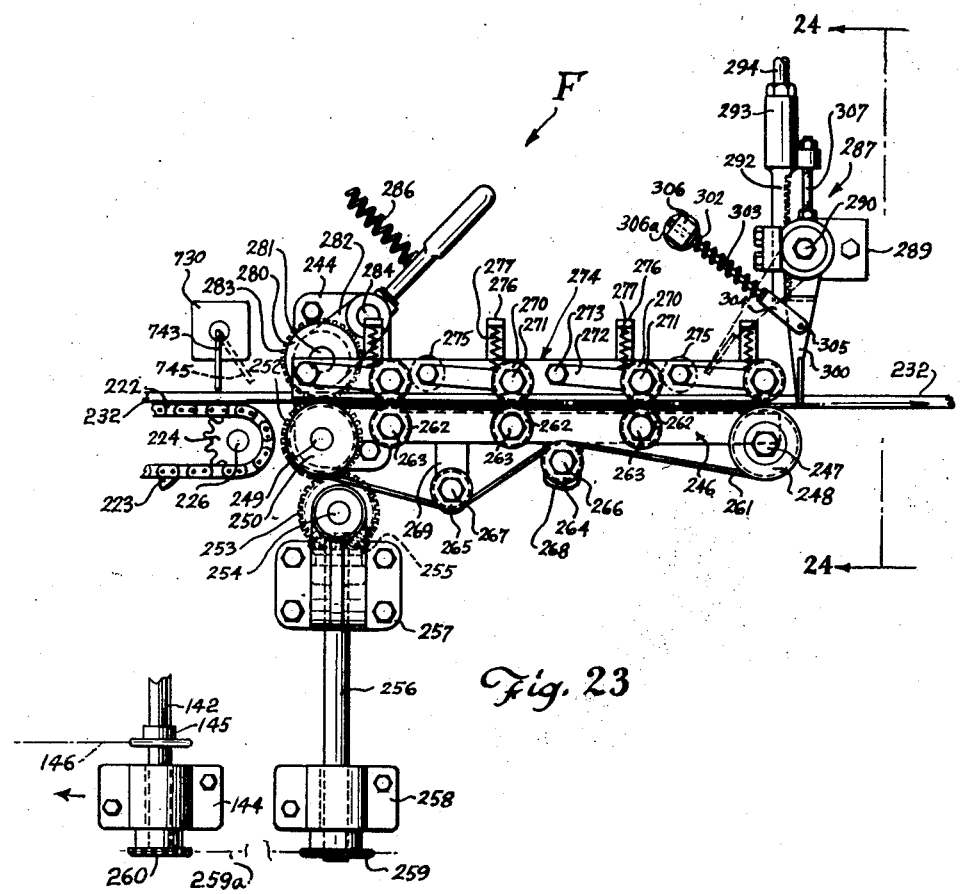

Figure 23 is a plan view of the unit F.

Figure 24:
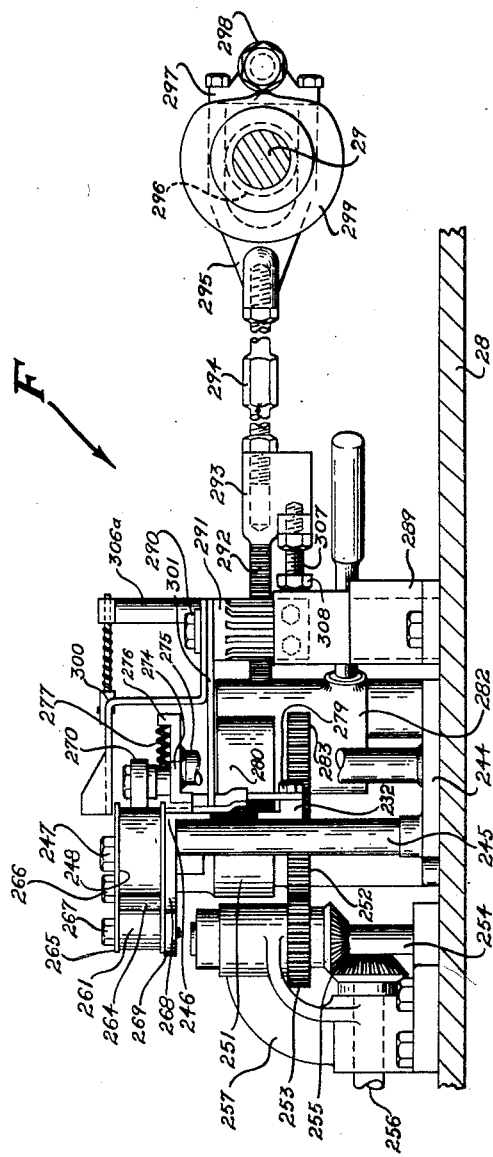

Figure 24 is a vertical sectional view taken at the line 24—24 of Figure 23.

Figure 25:
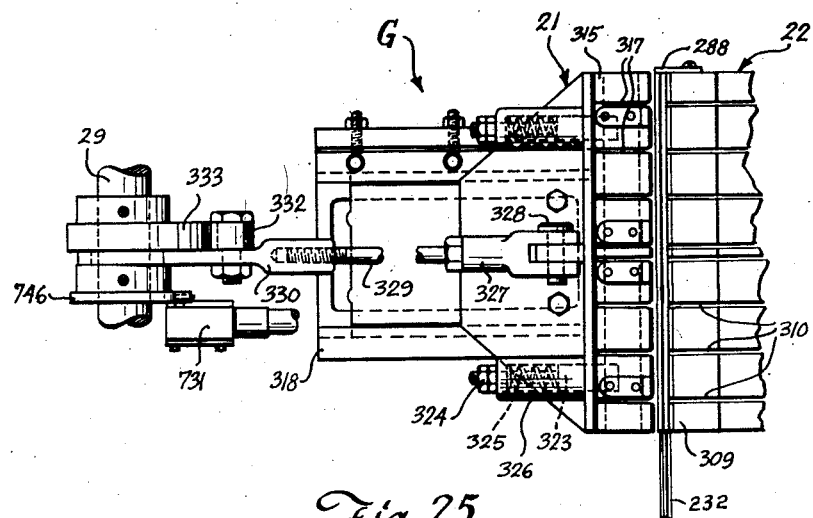

Figure 25 is a plan view of the cross partition insertion unit G.

Figure 26:
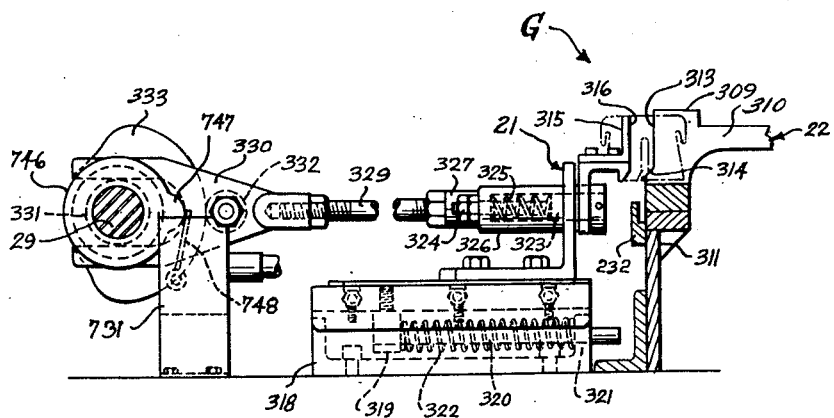

Figure 26 is a view in elevation of the unit G and its vise-jaw mechanism.

Figure 27:
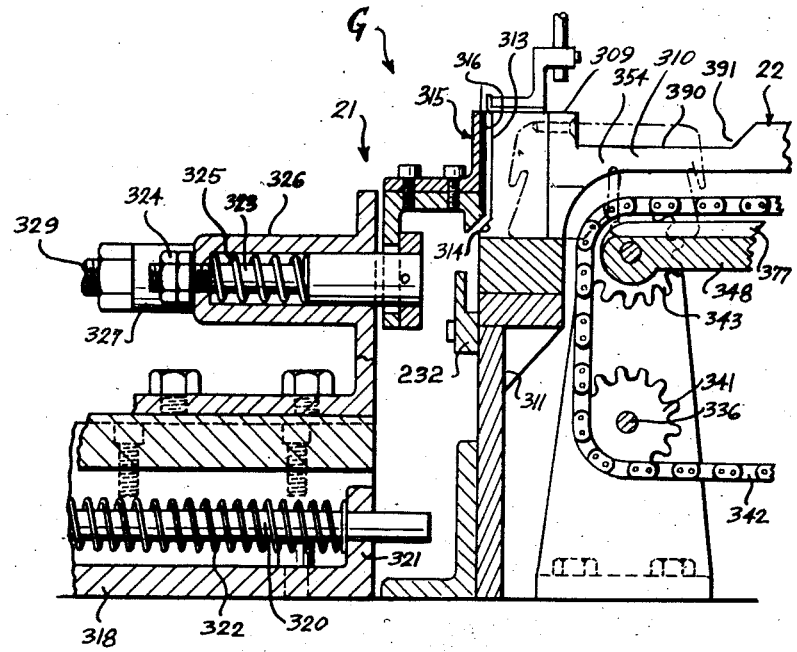

Figure 27 is an enlarged fragmentary sectional view showing details of the reciprocating head of the unit G together with the contiguous portion of the cross partition conveyor.

Figure 28:
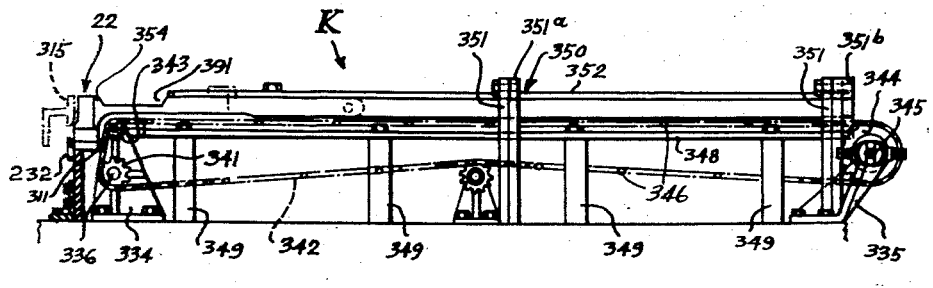

Figure 28 is an elevation of the cross partition conveyor and guideways interconnecting the unit G with the several cross partition magazines K.

Figure 29:
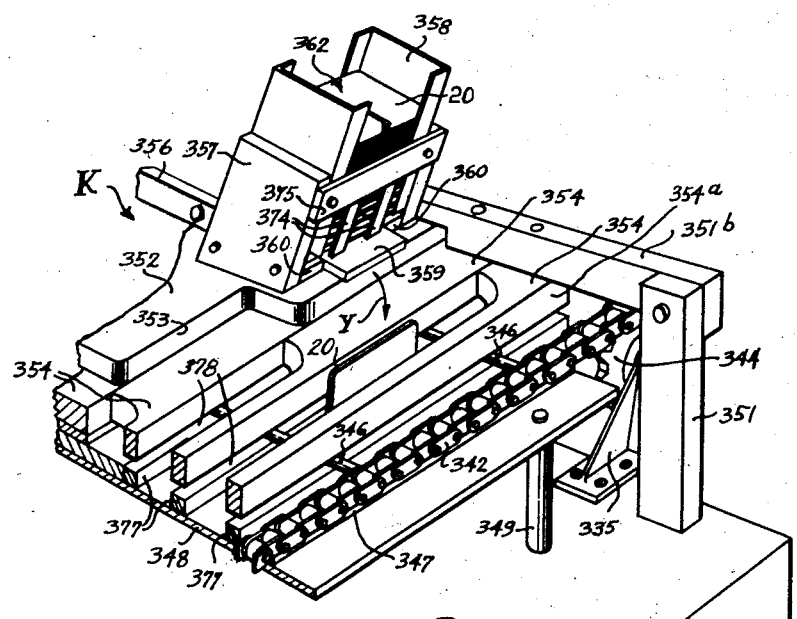

Figure 29 is a fragmentary perspective view looking in the direction of arrow A, Figure 32, illustrating one of the cross partition magazines and its disposition relative to one of the guideways with which it is individually associated and showing also a portion of the continuous conveyor which operates to propel the cross partitions along the guideways to the cross partition inserting unit G.

Figure 30:
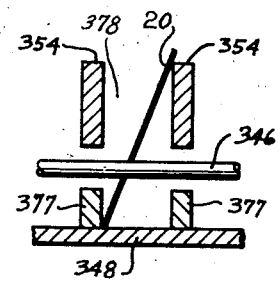

Figure 30 is a sectional view looking toward the jaw mechanism of the unit G and embodying a pair of guide means and a conveyor bar for moving a cross partition which is shown resting between a pair of guide means toward the unit G. This view is substantially in line with one of the magazines.

Figure 31:
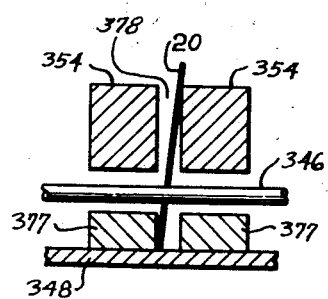

Figure 31 is another section similar to Figure 30 but taken adjacent the jaw mechanism, this figure being aligned below the Figure 30 to illustrate the tipping of a cross partition as it is conveyed along between the guides for feeding into the jaw mechanism.

Figure 32 is a plan view illustrating the group of guideways along which the cross partitions are conveyed from the magazines to the cross partition inserting unit G and showing in part the conveyor which serves to propel the cross partitions along the guideways, the cross partition magazines having been omitted from the view.

Figure 33 is a plan view of the pusher mechanism used in conjunction with the cross partition feeding unit K.

Figure 34:
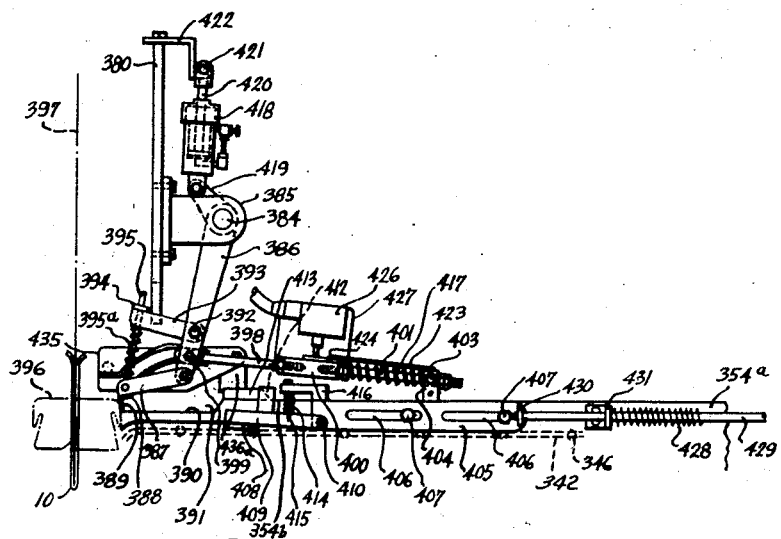

Figure 34 is an elevation of the cross partition pusher mechanism wherein the pusher bar is shown in the advanced position which it acquires at the end of each forward stroke.

Figure 35:
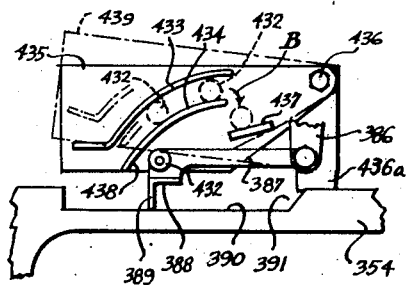

Figure 35 is an enlarged detail illustrating the cam mechanism which serves to elevate the pusher bar of Figure 34 during each retractive stroke thereof.

Figure 36:
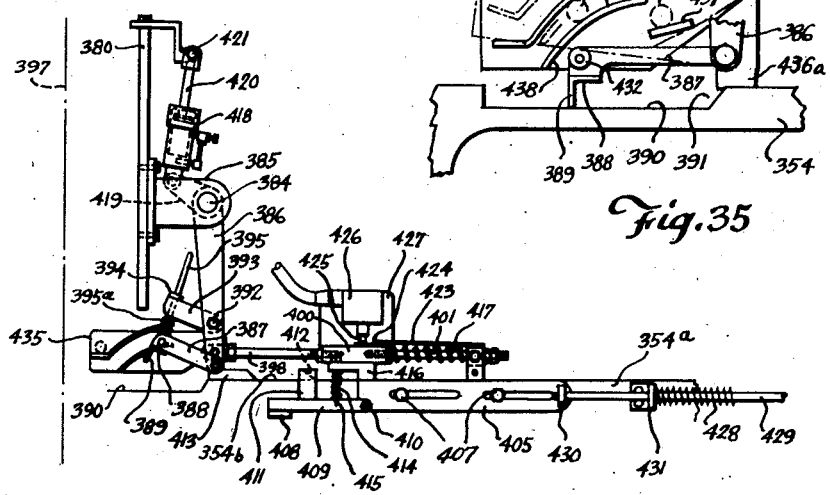

Figure 36 is an elevation of the cross partition pusher mechanism identical with Figure 34 but showing the various moving parts in their retracted position.

Figure 37 which is a transverse sectional view of the guideways and conveyor of unit K, illustrates the first and last in order of the eight cross partition magazines and the disposition thereof relative to their respectively associated guideways.

Figure 38 is a detail in section of one of the magazine actuating eccentrics.

Figure 39 is a partial operational view of the feeding mechanism utilized in conjunction with each magazine.

Figure 40 is an elevation of the mechanism forming a component part of the inserting unit G which serves to lift the carton blanks after the cross partitions have entered the slots thereof for the purpose of lowering the cross partitions relative to the blanks and locking them thereto.

Figure 41 which is a detail of a portion of the mechanism of Figure 40 illustrates the parts which serve to hold down the cross partitions while the carton blanks are being elevated.

Figure 42 is the view on the section plane 42—42 of Figure 40.

Figure 42a is a view similar to that of Figure 42 with some of the mechanism removed to reveal the mounting plates therefor.

Figure 42b is a section on the line 42b—42b of Figure 42a.

Figure 42c is a sectional elevation on the line 42c—42c of Figures 33 and 42, illustrating the relation of the components of Figures 33 to 36 and Figures 42 to 45.

Figure 43 is a detail view taken at line 43—43 of Figure 42.

Figure 44 is a detail of the lifting mechanism showing one of the lifting arms in gripping engagement with a carton blank.

Figure 45 which is a view similar to view 44 shows the lifting arm in its retracted position.

Figures 46, 47, 48:
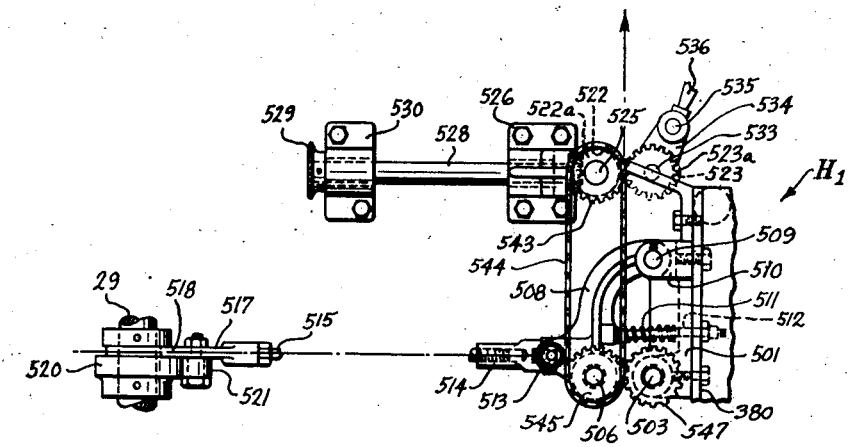

Figure 46 is an elevational view of the mechanism which serves to transfer the carton blanks with cross partitions from the unit G to the unit H.

Figure 47 is a plan view of the apparatus of Figure 46.

Figure 48 is a partial plan view of means for progressively nesting the cross partitions in a carton blank, this view being separated for clarity from the apparatus of Figures 46 and 47, but understood to be mounted in conjunction therewith in any suitable manner.

Figure 49 is a plan view of the carton wall folder unit H wherein the two carton walls are each bent laterally along previously creased lines and each folded along one of the crease lines to enclose the overlap cross partitions and thus complete the knocked-down carton.

Figure 50 is an elevation of the carton wall folder unit H.

Figure 51 is a plan view of the stacker unit J.

Figure 52 is an elevation of the stacker unit J of Figure 51.

Figure 53 is an elevational view of a counter mechanism indicated generally by the letter O in Figure 51 and employed in conjunction with the carton stacker unit J to laterally displace certain of the knocked-down cartons of each stack, the displaced cartons being positioned at identical numerical intervals and consequently serving as convenient counters.

Figure 54 is an endwise elevation of the counting apparatus O shown in Figure 53.

Figure 55 is a detail view illustrating the manner of operation of the carton stop of Figures 53 and 54.

Figure 56:
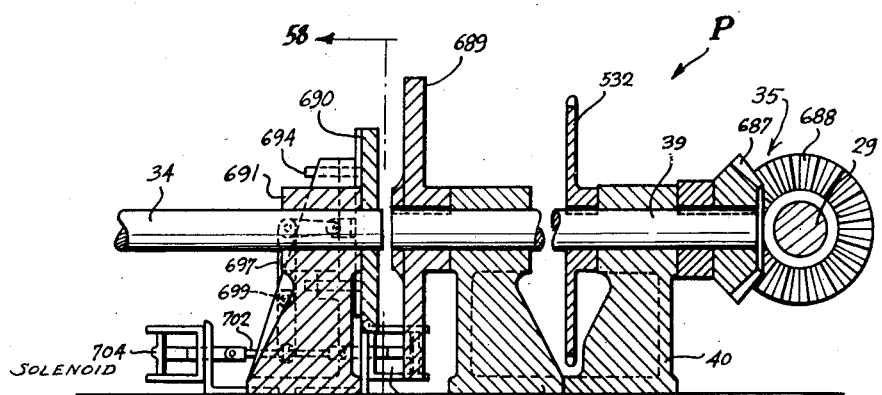

Figure 56 is an axis-wise sectional view of the clutch unit P and the pertinent mechanical elements.

Figure 57:
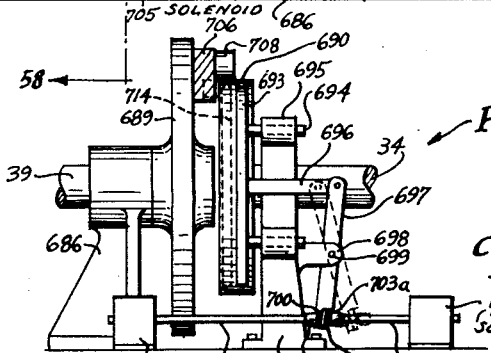

Figure 57 is a view of the solenoid actuated clutch device of Figure 56 from the far side of the latter figure.

Figure 58:
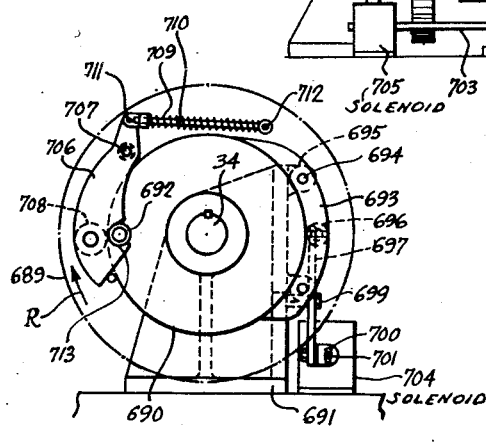

Figure 58 is a view on the line 58—58 of Figure 56 showing the drive relation of the clutch components.

Figure 59:
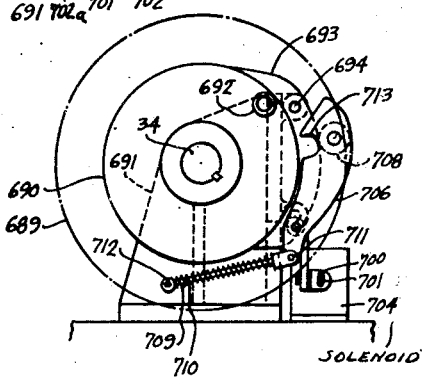

Figure 59 which is a view similar to Figure 58, illustrates an alternative condition wherein the driving and driven members are uncoupled.

Figure 60:
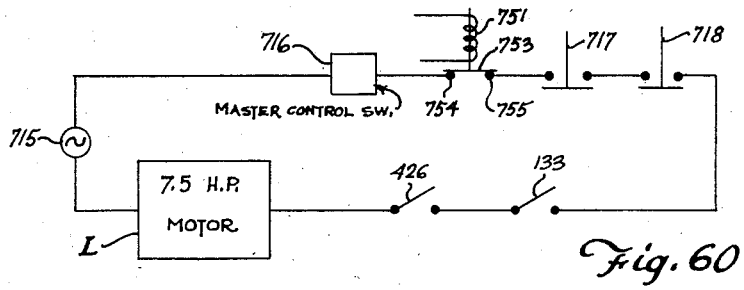

Figure 60 is an electrical schematic of the main drive circuit illustrating various control circuits in series therewith.

Figure 61:
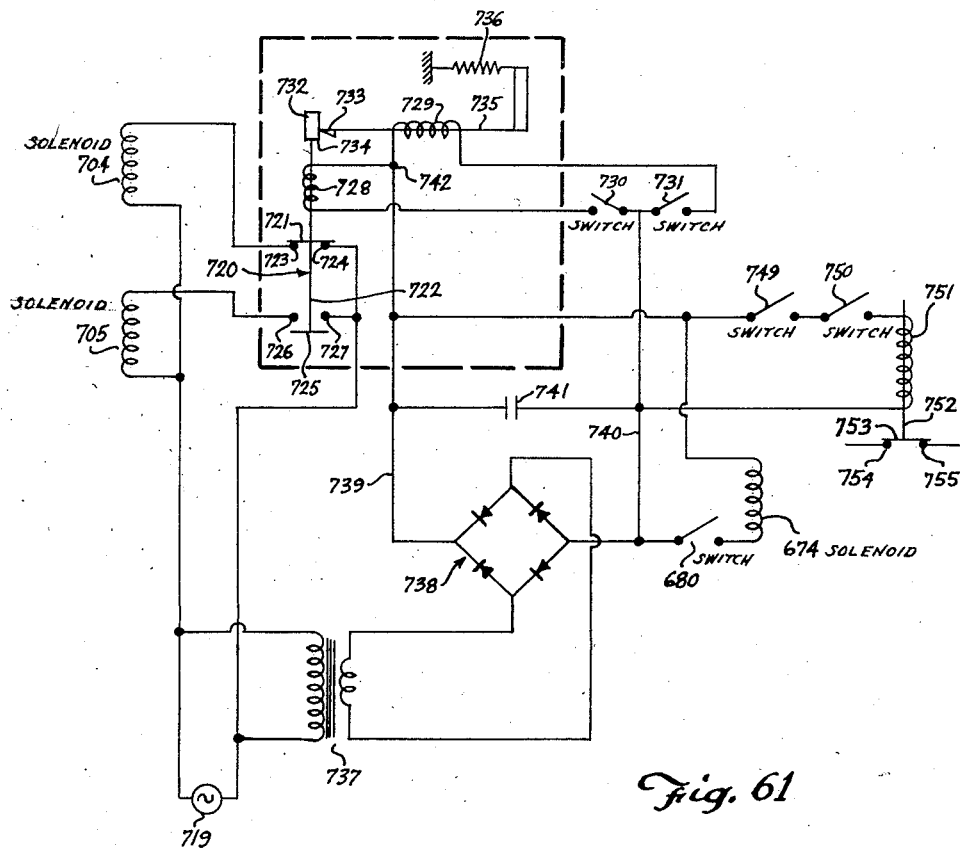

Figure 61 is a general schematic of control switch mechanism for the solenoid actuated clutch device of Figure 56 and the counting device of Figures 53 and 54 as well as the anti-jamming switch means of Figure 49.

Referring to the drawings and particularly to

Figure 1 it will be appreciated that the apparatus according to the invention is capable of receiving a plain carton blank from its magazine and creasing and perforating the same and folding it along a medial line for continual passage therethrough on a through and straight path. Thus, the blank 10 in Figure 1a is scored along a medial line 11 and the lines 12, 13 and 14, and substantially simultaneously is perforated with longitudinal perforations 15 in parallel spaced apart relation to the medial line 11. These operations are illustrated by the appropriate numerals shown on Figure 1b which also illustrates the formation of a transverse perforation or weakened line 16.

The next step in the series of operations is the folding of the blank along the medial line 11 as illustrated in Figure 1c but preferably just prior to this operation the end wings 17 defined by the crease lines 14, and the terminal ends of the blank are broken slightly along the crease line 14 to form a slight divergence of these end wings for more facile handling of the folded blank through following operations.

Figure 1d illustrates the next progressive step in the operations carried out on the blank showing horizontally spaced apart perforations 18 formed by punching, which are designed to receive cross partitions and the shorter perforations 19 therebetween which cooperate with the perforations 15 in allowing slight distortion of the walls of the carton for accommodating various sizes of eggs. Following this slotting step the medially folded and slotted carton blank is carried to a jaw mechanism employed in conjunction with cross partition inserting mechanism wherein a plurality of cross partitions identified by numeral 20 in Figure 1e and Figure 3 is inserted between the spaced apart jaw components 21 and 22. The vise jaw components are caused to move together as illustrated in Figure 1f whereby the medially folded blank is distorted to conform with the contour of the slot 23 having the locking tab 24.

In order to lock the cross partitions within the slots of the blank, the latter is drawn upwardly as illustrated in Figure 1g so that the walls of the blank are restored to planar form while at the same time the cross partitions are held at their initial inserted positions, as a result of which the locking tabs 24 are brought below the lower edge of the blank to engage in its notches 25 formed in conjunction with the operation illustrated and previously discussed with respect to Figure 1d.

Figures 1h and 1i are perspective views of partially completed knocked-down cartons, corresponding respectively to the two operational stages illustrated in Figures 1e and 1g. After the partitions are locked within the medially folded carton blank, the latter continues along its path of movement and the partitions are deflected to partially overlie one another in known manner.

One of the many novel features of this invention resides in the method and means for folding the upstanding walls of the carton blank progressively as illustrated in Figures 1k and 1l. In the first of these figures, the upstanding walls are broken on the crease lines 13 and the portions 26 thereof are bent downwardly to substantially a right angular relation with respect to the remainder of the upstanding walls; and finally the walls are broken and bent on the crease lines 12 to fold the portions 26 downwardly to the form illustrated in Figure 1l. The last stage in the formation of the knocked-down carton is the stacking operation illustrated in Figure 1m showing a stack of cartons 27.

*General description*

The apparatus utilized in carrying out the above operations in the formation of egg cartons in knocked-down form is illustrated generally in Figure 2 in conjunction with Figure 4 for clarity. The magazine A is designed to carry a plurality of blanks of the form shown in Figure 1. The blanks are fed to the perforator B which causes the transverse perforations 16 to be formed therein. The unit C comprises multiple roller mechanisms which in turn carry out the operations in the formation of the score lines 11 to 14, the longitudinal perforations 15 and the bending of the end wings 17. The operations carried out by units B and C are illustrated in Figure 4 by the blank indicated by letters bc. Folding apparatus D causes the blank to be folded along the medial line thereof to the form indicated by letter d of Figure 4. The perforator E carries out the operations indicated by the form designated by the letter e in Figure 4.

The blank is transferred from the perforator E to the vise jaw mechanism G by the transfer unit F. The cross partition feeding apparatus K cooperates with the vise jaw mechanism G to assemble the carton body with the cross partitions as indicated by the letter g in Figure 4. Next the progressive folding apparatus H folds the side walls of the carton body to the form indicated by letter h and in this latter form they are stacked in the stacker J.

The units A to G and K are mounted on a main frame 28 having a main drive shaft 29 extending longitudinally thereof and in parallel spaced apart relation to the through path 30. A secondary frame 31 mounts the unit J and is movable with respect to the frame 28 so that various lengths of unit H may be employed. It is not to be understood that adjustability is provided in this connection but by virtue of this preferable construction, a change-over is facilitated if desired.

Figure 5:
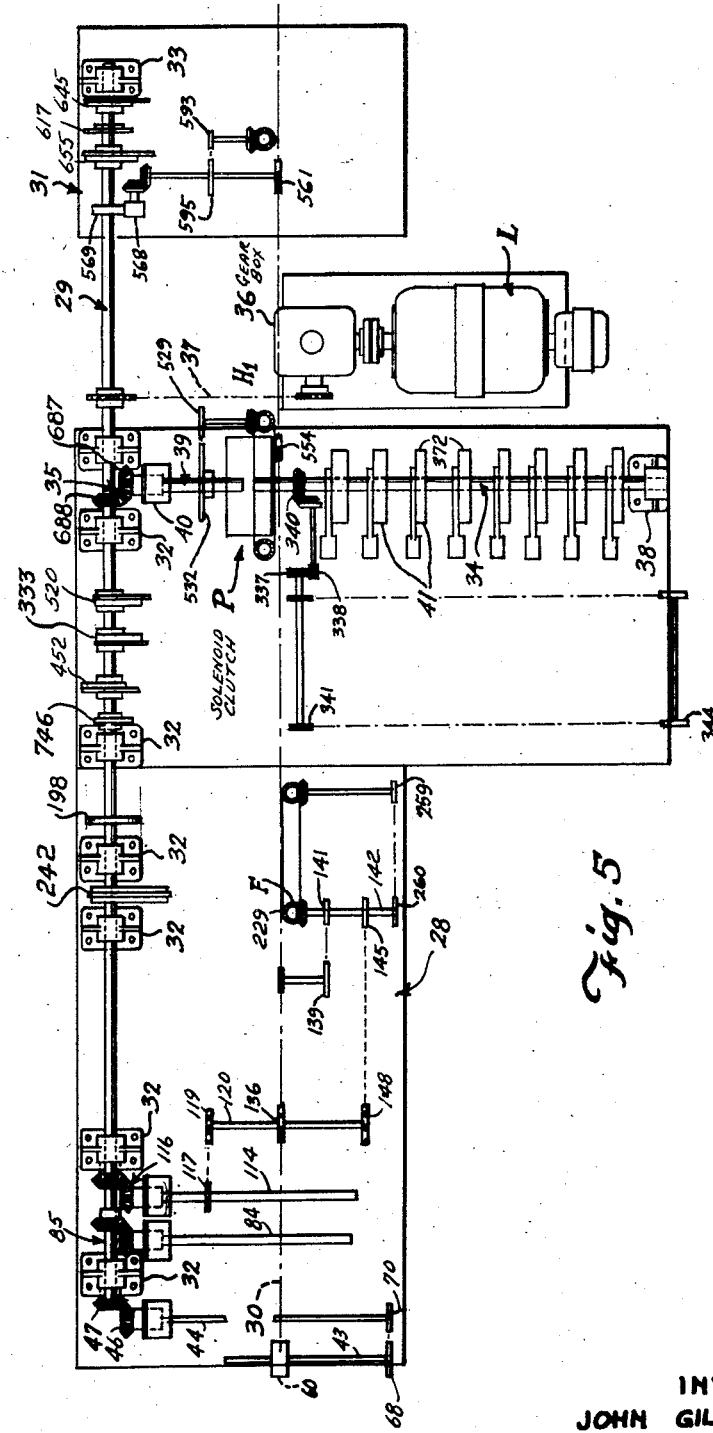
Figure 5 is a diagrammatic plan view of the main drive arrangement for the apparatus.

Referring also to Figure 5 the main drive shaft 29 is journaled in a plurality of pillow blocks 32 on the frame or bed 28 and in a similar pillow block 33 on the frame 31. A magazine drive shaft 34 is driven through the solenoid operated clutch P driven by bevel gear connection to the main shaft as indicated by numeral 35.

It will be therefore apparent that the drive mechanism is simple and leads to facility in synchronizing adjustments where required by virtue of the common drive motor L driving the main shaft 29 through the gear box 36 and chain 37. The magazine drive shaft 34 is positively driven by the clutch P when the driving and driven members thereof are intercoupled. The shaft 34 is journaled in a bearing 38 at its one end and is supported by the driven member of the clutch P, the continuing drive portion 39 of this shaft being supported at the driven end by the bearing 40. As indicated, the shaft 34 carries a plurality of driving cams 41 individual to the several cross partition magazines of the unit K.

It will be noted that the carton body is carried through the machine along a continuous rectilinear path 30 as previously described. It is in order now to discuss the specific structure of the various units which comprise the whole apparatus and make clear the several novel features of the invention.

Magazine unit A

Referring to Figures 6 to 8 this unit is mounted on a frame or bed 28 which carries the upstanding brackets 42 and 42a supporting the shaft 43. The shaft 44 extends from bracket 42a to the end bracket mounting 45 and carries the bevel gear 46 engaging bevel gear 47 connected to the main drive shaft 29. Secondary brackets 48 carry shafts 49 and 50 mounting pinching rollers 51 and 52 adapted to propel it to the perforator B. The shaft 49 is vertically adjustable by means of slidable mounting blocks 53 and yieldably depressed by pressure of compression springs 54 adjustable by the adjusting screw 55.

The magazine tray 56 pivotally mounted as at 57 on brackets 42 and 47a is adjustable in its inclination by the pivoted adjusting arm 58. The carton blanks 10 are stacked as at 59 in the magazine in the manner indicated, and the selector wheel 60 selects one blank at a time therefrom. The selector wheel preferably is of cast metal having a slightly eccentric cut-away portion defined by arcuate surface 60a on which rests a strap 61 preferably of rubber and fastened thereto by means of a bolt 62 located near the leading edge of the strap. In rotating in a counter-clockwise direction as illustrated in Figure 6, the free portion 61a of the strap 61 tends to move outwardly and being of a material of high friction characteristics, firmly grips the upper surface of a carton blank 10 causing the same to be engaged by the engaging roller 64a. Although the strap 61 is preferably of uniform thickness the arcuate surface 60a rises outwardly from the region of bolt 62. Further, the strap is preferably of greater arcuate length than the surface 60a so that the opposed end 61a of the strap is retained in a lodged position against the shoulder 60b. After gripping by the roller 64a the blank 10 will then be caused to move toward the rollers 51 and 52 which will grip the same and move it to the advanced position therebeyond as at 63.

Synchronization of drive is required in the operations carried out at this stage for effective handling of the carton blank. In this connection, the shaft 44 drives the gear 64 which in turn drives the gear 67 causing rotation of shaft 43. The latter shaft carries the gear 66 driving gear 65 (Figure 7) to rotate the shaft of engaging roller 64a. The other end of shaft 43 mounts the sprocket 68 which connects by the chain 69 to the sprocket 70 freely mounted on a stud shaft 71 (Figure 8) in conjunction with the gear 72 which meshes with gear 73 mounted on shaft 50 which also mounts supporting rollers 74, the latter serving to maintain the blank against sagging while passing between the rollers 51 and 52. Shaft 49 carries gear 76 driven by gear 73. The shaft 44 mounts a cam 77 positioned to engage the engaging wheel 78 on the end of the arm 79 fastened to the end of shaft 80. The shaft mounts a pair of swingable arms 81 having push fingers 82 which are designed periodically, by virtue of the contour of cam 77, to urge the blank 10 from its position of rest attained after passage through the rollers 51 and 52 at a point where the rollers are no longer in engagement with the blank (see also Figure 11). A suitable spring 82a is utilized for insuring positive engagement of the engaging wheel 78 with the periphery of the cam 77.

It is desired that the carton blank, after being fed, will arrive at a position of rest as indicated by numeral 63 so that the unit B may act to perforate the same transversely and form the weakened line 16, where it is desired that the apparatus form egg cartons of the twin-type. The perforation 16 (Figure 1a) is formed in the apparatus shown, by means of a vertically reciprocating cutting head but obviously rotary types of cutters could be employed if desired.

The perforator unit B

The perforator unit is illustrated in Figures 9 to 12 and comprises a platen 83 mounted on the frame 28 and carrying a drive shaft 84 having drive connection 85 with the main drive shaft 29. Exteriorly of the platen the shaft 84 carries the eccentrics 86 which slidably mount the yokes 87 from which are adjustably extended connecting rods 88 which support the reciprocating head 89. The latter is slidably mounted upon the guide rods 90 extending from platen 83 and carries the perforating blade 91 designed to cooperate with the die plate 92 in perforating a carton blank resting thereon. Shaft 84, opposite the driving end, carries a small cam 93 which engages an arm 94 fixed to shaft 95 mounted in brackets 96. The latter shaft carries the collars 97 which mount the links 98 which extend for connection to fittings 99 fastened to the underside of swingable arms 100 having stop members 100a mounted in cut-away portion 100b of the guide strips 101 which extend from cantilever connection to abutment 101a of platen 83. As the eccentrics 86 cause the yokes 87 to move to the position indicated in Figure 10, after the blank 10 has been perforated at 16 by the perforating blade 91, the shaft 95 will be rotated to cause arms 100 to swing downwardly to draw the stop members 100a thereof out of interference with the blank 10 in position 63. The push fingers 82 (see Figure 6) due to synchronization of drive will strike the carton blank causing it to move forward into the creasing rollers 102 and 103 after which motion of the blank is continuous to the slotting stage.

Creasing and perforating unit C

In Figures 13 to 16 is shown the creasing and perforating unit C comprising the creasing unit C1 and the perforating unit C2 mounted on the common brackets 104 and 105. The unit C1 comprises the creasing or scoring rollers 102 and 103, each of which has scoring flanges 106 and 107 respectively between certain of which extend guide straps 101 (see Figure 11) in predetermined spaced apart relation according to the location of the creases desired in the carton blank. The roller 102 has a mounting shaft 108 journaled in adjustable bearing blocks 109 which rest on compression springs 110 in the recesses 111 of the brackets. Suitable cover pieces 112 carry adjusting screws 113 whereby the peripheral spacing of the rollers 102 and 103 may be adjusted. One end of shaft 114 extends outwardly of bracket 105 through a supporting bracket 115 to mount a bevel gear 116 for drive connection to the main drive shaft 29. Shaft 114 also carries a sprocket 117 which meshes with a chain 118 causing rotation of sprocket 119 driving shaft 120. A plurality of supporting rollers 121 are mounted on shaft 120 and are disposed below shaft 122 carrying the nipping and bending rollers 123 adjacent brackets 104 and 105, and in the mid-region the parallel spaced apart rotary cutters 124.

In Figure 16 is shown a cutter 124 comprising a main body 125 having a plurality of peripherally spaced cutter blades 126 radially extending therefrom of dimensions appropriate to the formation of the perforations or slots 15 (Figure 1b). Shaft 122 is mounted in adjustable bearing blocks 127 each resiliently mounted between opposed compression springs 128 and 129 which latter is centred in the carrying slot 130 formed in the brackets 104 and 105. Cover plates 131 support adjusting screws 132 which serve to adjust the compression of springs 128 and 129 to determined the degree of positive cutting action of the cutting blades 126.

Referring also to Figures 6 and 10, a blank, after having been perforated by the unit B, will be kicked forward in the manner previously described by the push fingers 82 and at that moment the stop members 100a will be withdrawn to allow passage of the blank over guide strips 101 for engagement by the rollers 102 and 103 causing the same to be drawn through the unit C. In the unit C1 the blank is scored or creased at 12, 13 and 14 by the creasing flanges 106 and 107. In the sub-unit C2 the blank is operated upon to form the perforations 15 (Figure 1b) and simultaneously the edges of the blank are broken down on the crease line 14 by the nipping and bending rollers 123 to form the end wings 17.

At this stage automatic switch means are preferably included in circuit with the main drive motor whereby the whole apparatus is stopped in its operation in the event of more than one carton blank at a time passing through the unit C2, because such an occurrence would otherwise lead to jamming of the machine at a subsequent stage. The thickness limit switching means here referred to comprises a normally closed microswitch 133 mounted on the bearing bracket 104 and arranged to be actuated to open the circuit of the main drive motor L in response to an upward movement of the bearing block 127 in excess of that which accompanies the passage of a single carton blank between the rollers. The bracket 127a of the block 127 engages the plunger type switching arm 133a to actuate the switch upon predetermined upward movement of the block 127 according to the placement of the arm 133a relative to the bracket 127a.

Medial folding unit D

Referring to Figures 17 and 18 the medial folding unit D is designed to fold the carton blank on the medial crease line 11 (Figure 1b) in continuous manner and for this purpose conveying means are provided in the form of an endless chain 134 having engaging studs 135 extending from the links thereof, said chain being mounted at one end on the sprocket 136 which is freely mounted on shaft 120 of the subunit C2 of Unit C (see Figures 14 and 18). The endless chain 134 is tensioned over the drive sprocket (not shown) mounted on shaft 137 in conjunction with the adjustable tensioning idler 138. Shaft 137 has a drive sprocket 139 connecting by drive chain 140 to sprocket 141 on shaft 142 mounted in brackets 143 and 144. A sprocket 145 fixed thereto adjacent bracket 144 is engaged by drive chain 146 passing about the tensioning idler 147 and extending for drive from the sprocket 148 which is fixed to the end of shaft 120 (see also Figure 14). A folding plate 149 (shown in Figure 18 but omitted from Figure 17 for clarity) having an inclined bottom edge 150 is centrally supported by suitable mounting standards 151 and 152 having cross members 153 and 154. The inclined bottom edge 150 is designed to engage the carton blank along the crease line 11 to medially fold the same along this line in conjunction with engagement of the remainder of the carton progressively by the upwardly converging tines 155.

The group of tines 155 are comprised of the outer guide bars 156 fastened near their one end by welding to the supporting bar 157 and welded at their converged ends to the flanged lips 158 which are in turn supported by the bolt and sleeve members 159 extending from a bracket 160 on the frame 161 surmounting the reciprocating slotting head of unit E. An inner pair of rods 162 are each welded at one end to the supporting bar 157 at the other end 163 to the adjacent bar 156. Additional converging bars 164 are fastened to the bars 162 as at 165 and extend therefrom in cantilever manner. The latter bars function to press together the upstanding walls of the folded earlier carton blank so that they can be gripped by the pinching rollers 166 and 167.

The pinching rollers are mounted on a bracket 168 and the shaft 169 of roller 167 carries a gear (not shown) meshing with gear 170 mounted on free shaft 171 in bracket 143. The latter shaft also carries the bevel gear 172 which meshes with a bevel gear 172a on shaft 142. Roller 166 is freely mounted on shaft 173 in pivotally mounted arm 174 mounted by pin 175 to bracket 168. A suitable spring 176 connects the arm 174 to an anchorage 177 thereby yieldably urging the roller 166 toward the roller 167 whereby to effectively grip each succeeding medially folded carton blank and propel the same forwardly into the unit E.

The slotting unit E

The mechanism of the slotting unit E is illustrated in Figures 19 to 22 and comprises a stationary die head 178 and a horizontally reciprocable ram 179 which is surmounted by a frame or plate 161, supported by standards 180, as shown in Figures 18 and 19.

The mechanism involved in passing a carton blank into the unit E will first be described and upon referring to Figure 19 in particular, it will be noted that a bracket 183 mounted on frame 161 has posts 184 and 185 extending therefrom to mount the presser member 186 pivotally mounted adjacent the enlarged receiving end by bracket 187 to post 185. The other end of the presser member connects by the pivoted screw 188 through a hole in the end of post 184 and including compression spring 189 whereby the downwardly depressing effect of the member may be adjusted (see Figure 18). As the carton body passes between the components of the slotter, the wing portions 17 thereof (Figure 1c) will be drawn together by the presser member 186 completing the drawing together of the upstanding walls thereof in preparation for the slotting operation. A stop member 190 is positioned to arrest the forward motion of the carton blank at a predetermined point while the ram 179 is retracted. Referring also to Figure 20 it will be observed that the stop member 190 is attached to the end of an arm 191 having a slot 192 designed for slidable reception of the bolt 193 extending rigidly from the bracket 194 mounted on frame 161. The other end of the arm 191 pivotally connects to the cam arm 195 as at 196, the latter carrying cam roller 197 designed to engage the cam 198 mounted on main drive shaft 29. The cam roller 197 is disposed between the ends of the cam arm 195, the other end of the cam arm being pivotally connected as at 199 to the bracket 200 fastened to the main frame 28. A support member 201 fastened to the arm 191 by suitable bolts 202 is slidable at its free end in a guide block 203 mounted on the upper end of standard 204 extending from the main frame 28. A compression spring 205 insures positive engagement of cam roller 197 on the cam 198 by bearing against the bracket 206 on frame 161 and on the adjusting nut 207 of the carrying shaft 208 thereof which is fastened to the bracket 209 fixed to arm 191 at its one end, the other end thereof passing slidably through the bracket 206.

It is essential that each carton blank be positioned by the stop member 190 in correct orientation to the slotter punches, and to that end there is included means for positively urging the carton blanks forwardly against said stop member shown in Figure 19 but omitted from Figure 17 for purposes of clarity. Thus the arm 210, having the spring restrained kicker gate member 211 pivotally mounted on the free end thereof, is fulcrumed at its other end on a pin 212 carried by an arm 213 of frame 161. A stud pin 214 extends downwardly from the underface of the arm 210 to be engaged by a cam plate 215 which extends upwardly from its mounting place 216 which is fixedly secured to the ram 179 of the slotter unit. A rod 217 pivotally connected as at 218 to the arm 210 extends slidably through a hole (not shown) in bracket 219 on the crossbar 153. A compression spring 220 is mounted on the rod 217 having one end fixed relative thereto by a collar 221 whereby the arm 210 is continuously urged in a counter-clockwise direction as illustrated in Figure 19. As the reciprocable ram 179 moves toward the fixed die head 178 the cam plate 215 (Figures 19, 21 and 22) moves with it, thus enabling the arm 210 (Fig. 19) to rotate counter-clockwise under the impetus of the spring 220 and strike the trailing edge of the carton blank, thereby to propel the same forwardly against the stop 190 (Figure 19) immediately before the carton blank is gripped between the punch and die elements.

Upon completion of the slotting operation, the stop member 190 is withdrawn from its effective position by the cam 198 and associated mechanism hereinbefore described, and the feeding chain 222 causes the carton blank to be passed to the transfer unit F as a result of engagement of the trailing edge of the blank by a single laterally projecting lug 223 attached thereto and movable therewith. The chain 222 passes around and engages two sprockets 224 and 225 which are freely mounted respectively on the shafts 226 and 227 projecting inwardly from the stationary die head 178. Another sprocket, identical with the sprocket 225 and attached thereto, in side-by-side relation, is also freely mounted on the shaft 227 and meshes with a chain 228 driven by a sprocket 229 secured to the continuously rotating shaft 169 and to the pinch roller 167 (see Figure 17).

In Figures 21 and 22 the ram 179 is shown in conjunction with the stationary die head 178 with previously discussed apparatus removed for clarity. The die head 178 is fastened to the frame 28 by a suitable means such as bolts 230 and carries the die 231 on the face thereof, including a supporting track 232 extending from the folding apparatus D (Figures 17 and 18) upon which the medially folded carton blank 233 is conveyed and rests while in the perforator. The ram 179 is reciprocably mounted in the base guides 234 and 235. Braces 236 support a face plate 237 to which a punch block 238 and slotting punches 239 carried thereby are fastened for forming slots 18 and 19 and cut-away portions 25 (Figure 1d) in conjunction with the die 231. The ram 179 has integral bosses 240 and 241 bored to receive a drive pin for the connecting rod 242 which is driven by the eccentric 243 mounted on main drive shaft 29. It is not necessary to discuss the specific structure of the punch and die per se since these are of conventional form.

After the medially folded carton blank has been slotted the same is fed toward the transfer unit F by means of the lug 223 extending from the feeding chain 222 previously described with reference to Figure 19.

The transfer unit F

In Figures 23 and 24 there is shown the transfer unit F comprising a frame piece 244 fastened to the main frame 28 having standards 245 supporting the longitudinally extending angle piece 246 which at one end carries shaft 247 freely mounting roller 248 and at the other end receiving a shaft 249 driving a roller 250 at the upper end thereof. Shaft 249 also drives the nipping roller 251 located below the roller 250 and is driven by gear 252 meshing with drive gear 253 fixed to shaft 254 which is driven through bevel gears 255 by the shaft 256 journaled in brackets 257 and 258 and having a sprocket 259 at the free end thereof carrying a chain (not shown) which is driven by sprocket 260 on shaft 142 (Figure 17). Rollers 250 and 248 carry the belt 261 which passes over the idler rollers 262 which are freely mounted on stud shafts 263 extending from the angle bracket 246. Tensioning idler rollers 264 and 265 are freely mounted on stud shafts 266 and 267 supported by straps 268 and 269 welded to the angle bracket 246. Cooperating guiding rollers 270 are mounted on stud shafts 271 on the free ends of arms 272 pivoted as at 273 on the longitudinally extending frame piece 274 which is supported by the posts 275 extending upwardly from the frame piece 244. Brackets 276 extending laterally from the frame piece 274 serve an anchorages for compression springs 277 which engage and press against the arms 272 to urge rollers 270 toward the adjacent rectilinear span of the belt 261, so that the passing medially-folded carton blanks are held in firm contact with the moving belt and thus propelled thereby.

The blank is fed through the unit F while resting on track 232 continuing therethrough and fastened to the posts 245 by bolts 279 which also pass through the lower portions of the longitudinally extending frame piece 274 (Figure 24). The chain and lug feed device indicated by numerals 222 and 223 of the unit E (Figure 19) causes a slotted blank to be fed into the unit F. The blank is further gripped by pinching roller 280 mounted for cooperation with nipping roller 251. The roller 280 is fixed to shaft 281 freely carried by the swingable member 282 and is driven by gear 283 (Figure 24) which meshes with gear 252. The swingable member 282 is pivoted as at 284 on the frame 244 and has an arm extending therefrom to which is connected a tension spring 286 extending therefrom to a suitable anchorage.

A kicker mechanism generally indicated by the numeral 287 is employed for positively urging a medially folded blank into the unit G until the same rests against an end stop 288 (Figure 25)

in the latter. The kicker mechanism comprises a supporting base 289 freely mounting shaft 290 which in turn mounts the gear 291 which engages in the rack teeth 292 of the reciprocating bar 293. The bar 293 is adjustably connected by the connecting rod 294 to the yoke 295 which slidably rides on the sleeve 296 and drive shaft 29 and mounts end bracket 297 carrying cam roller 298. A cam 299 fixed to shaft 29 is disposed to engage the cam roller 298.

A pair of kicker arms 300 and 301 extend from shaft 290 for kicking a medially folded carton blank into the space between the vise-jaws of the unit G upon appropriate movement of bar 293. Compression spring means 302 are provided to normally urge the arms 300 and 301 in a counterclockwise direction (Figure 23) to insure positive engagement of roller 298 with the cam 299. Spring 302 is freely mounted on rod 303 between the clevis 304, which is pivotally connected as at 305 to the arm 300, and the spring restraining block 306 pivoted on post 306a extending upwardly from main frame 28. The bar 293 includes a stop adjustment 307 having a stop member 308 designed to engage the supporting base 289 at the desired end limit of swinging movement of the arms 300 and 301.

*The cross-partition inserting apparatus G*

The apparatus identified in Figure 2 as unit G is further illustrated in Figures 25 to 27. It comprises a power operated vise which functions to grip, individually, each consecutive medially folded carton blank and hold the same rigidly in a position to receive the cross partitions 20 in the slots 18 thereof, while at the same time bending the carton blanks so that the sloping portions of the slots 23, above the projections 24 (see Figure 3) of the cross partitions are enabled to receive the lower margin of the carton blank.

The power-operated vise comprises a horizontally reciprocable head 21 and a stationary head 22 (see Figures 1c to 1g). The stationary head 22 comprises a stationary jaw 309 having a group of parallel transverse slots 310 equal in number to the cross partitions, per carton, and a width in each case which is but slightly greater than the thickness of one cross partition, and supported on a stationary plate 311 forming part of the frame of the machine. The end stop 288 which is bolted to the stationary head serves to locate each carton blank lengthwise while the same is supported by a channel-like guide extension of track 232 and is attached to the plate 311. The bottom area of the carton engaging face 313 of the stationary jaw 309 is inclined at an angle as shown at 314 corresponding to the angular lower portion of the slots 23 of the cross partition (see Figure 3) so that when a carton blank is gripped between the jaws of the vise it is bent in the manner depicted in Figure 1e to clear the hooks 24 of the cross partitions when the latter are moved transversely of the carton blanks into the slots 18 thereof.

The reciprocable head 21 includes the movable jaw 315 having a carton engaging face 316 the bottom area of which is inclined to complement the inclined surface 314 of the stationary jaw face and to cooperate therewith to effect bending of the carton blanks. The movable jaw 315 has a series of transverse slots 317 corresponding to the slots 310 and providing clearance for the cross partitions when the latter have passed through the carton blank slots 18. The reciprocable head 21 is slidably supported on a fixed base 318 and has a depending lug 319 (see Figure 26) to which is secured a pin 320 extending parallel to the path of reciprocation of the head 21 and slidable in an opening provided therefor in the end wall 321 (see Figure 27). The pin 320 serves to support a compression spring 322 which functions to bias the reciprocable head 21 toward the open-jaw position. The movable jaw 315 is supported by a pair of guide pins 323 which are slidable lengthwise in the bores of tubular bosses 326 constituting integral parts of the body of the reciprocable head; compression springs 325 are housed within these bosses to bias the movable jaw toward the stationary jaw while enabling the movable jaw to yield upon exerting a predetermined amount of pressure against the carton blank. The degree of exerted pressure is determined, within limits, by taking up or slacking off on adjusting nuts 324.

The reciprocable head 21 is pivotally connected through a wrist pin 328 to one of a clevis 327 adjustably threaded to one end of a connecting rod 329, the other end of which is adjustably threaded to a bifurcated yoke 330 slidably embracing a cylindrical sleeve 331 on the main drive shaft 29. The yoke 330 carries a rotary cam follower 332 which engages the periphery of a cam 333 mounted on the shaft 29 and designed to actuate the reciprocable head 21 so as to open and close the jaws of the carton engaging vise in the required sequence. The jaws are held closed while the cross partitions are being inserted and for a following interval while the carton blank is being lifted (see Figure 1g), and thereafter the jaws are opened to permit expulsion of the assembled carton blank and cross partitions and entry of the next succeeding carton blank.

*Cross partition feeding and magazine unit K*

The supporting structure for the unit K is shown generally in Figure 28 which is an elevation of the apparatus of Figure 32. Figure 28 illustrates principally the conveying means of the unit K for propelling cross partitions toward the unit G after receiving same from the magazines. The conveying means comprises end brackets 334 and 335, the former mounting a shaft 336 which carries a gear 337 meshing with gear 338 on shaft 339 driven by shaft 34 through bevel gears 340. Shaft 336 mounts drive sprockets 341 engaging conveyor chains 342 which embrace idler sprockets 343 and 344 which latter are mounted on stud shafts 345 supported in brackets 335.

Referring also to Figures 32 and 37, the endless chains 342 carry the transverse conveyor bars 346 which on the upper span of the conveyor ride along tracks 347 at their free ends. The tracks 347 are supported by the base plate 348 which in turn is supported by standards 349.

The remainder of the conveying unit is mounted on a secondary frame 350 comprising standards 351 and the magazine base plate 352, supported by crossbars 351a and 351b, and cut away in stepped formation as at 353 corresponding to the location of magazines yet to be described. Two groups of guide strips whose members are identified respectively by reference numerals 354 and 377 extend lengthwise of the chain belts 347 and are disposed below the magazine mounting plate 352; and these groups are spaced apart vertically (see Figures 37 and 29 to 31) to provide clearance for the conveyor bars 346. The two strips 354 and 377 of each vertical may be of identical configuration, as viewed in Figure 32; and the several strips of each group are spaced apart laterally (see Figure 32) to form a series of guideways 378 each of which extends from one of the narrow slots in the stationary jaw of the vise unit G to a location opposite one of the cross-partition magazines on the magazine mounting plate 352. The upper guide strips 354 are supported in part by the mounting plate 352 and, in part, by the cross-bars 351a and 351b. The lower guide strips 377 are supported by the base plate 348.

Referring to Figures 29, 37 and 39, a plurality of cross partition magazines equal in number to the guideways 378 are mounted on the magazine base plate 352 each by a supporting bracket 355 comprising an inclined supporting plate 356 which in turn mounts the spaced apart side plates 357. The bracket 355 is designed to receive a removable container 358 which holds a stack of cross partitions, the latter being fed by gravity toward the magazine dispensing plate 359.

In Figure 29 guide bars 360 are carried by supporting plate 356 in spaced apart relation to guide the magazine dispensing plate 359. In Figure 39 the magazine dispensing plate is shown in section disposed to select a single partition 20 from the group 362 of partitions 20 in the magazine, the magazine dispensing plate 359 having a step 363 of sufficient depth to engage the edge of one cross partition only. A lug 364 extends from the upper end of the magazine dispensing plate 359 to mount links 365 connecting the actuator arm 366 which is pivoted as at 367 to the supporting bracket 355. Each actuator arm 366 for the magazine dispensing plate of each magazine connects to a connecting rod 368 by connecting means 369, the connecting rod adjustably extending to fasten to a slidable yoke 370 slidably mounted over a sleeve 370a (Figure 38) on the drive shaft 34. Each yoke 370 carries a roller 371 designed to engage in the actuating eccentrics 372 (see also Figure 32). Each eccentric has an annular groove 373 designed to receive a roller 371 in slidable relationship therewithin to positively cause actuation of the actuator arms 366 both in the advancing and retiring of the dispensing plates 359. By virtue of the provision of a plurality of these annular type eccentrics, one for each actuator arm for the magazine feeding, adjustments are facilitated by reason that each eccentric may be adjusted rotationally with regard to the shaft 34 whereby the feeding function of each magazine may be adjusted individually for synchronism.

In Figure 29 a magazine dispensing plate 359 is shown extending from the magazine in a position in which it arrives for discharging a cross partition in the direction of arrow Y between the guides 354 so that only one partition at a time will be selected. Retaining fingers 374 are mounted by crossbar 375 on the holders 357.

Referring to Figures 30 and 31 a partition 376 is shown resting between guides 354 after being deposited by a magazine dispensing plate from a magazine. The lower edge of the partition rests on the plate 348 between the lower guides 377 which are in spaced apart relation to the guide 354 to accommodate the conveyor bars 346. As clearly illustrated in the plan view, Figure 32, each of the eight guideways 378 is greatly widened at the area immediately adjacent its individual associated magazine and is continuously tapered lengthwise from this widened area to a point near the delivery end of the cross partition conveyor, from which point on each guideway is narrowed to a constant width but slightly greater than the thickness of one cross partition. It would be feasible to make the guideways 378 of a uniformly narrow width throughout their respective lengths; but it is relatively disadvantageous to provide magazines and dispensing mechanisms which would feed the cross partitions, one at a time, into such narrow guideways.

The most convenient and economical arrangement of magazines and dispensers, taking all factors into consideration, is that herein described, and in order to facilitate such an arrangement and at the same time avoid certain undesirable complexities it has been found most expedient to make the guideways of considerable width at the areas where they receive the cross-partitions from the magazines. The reason, of course, is found in the fact that the cross partitions fall by gravity from the magazines into the guideways, and the latter must be wide enough to provide against the possibility of partitions failing to enter. On the contrary, the guideways must not be wide enough at the reception areas to allow the partitions either to lie flat on the plate 348 or at such a small angle to the horizontal that they will not be engaged by the conveyor bars 346 or, if engaged thereby, that they may not become wedged between the walls of the guideways. A practical relative width at the widened area is illustrated in Figure 30, from which it will be apparent that the cross partitions (one of which is shown and identified by the reference numeral 20) are capable of being propelled along the guideways by the conveyor bars 346 without any possibility of their becoming wedged between the walls of the guideways and perhaps resultantly damaged.

When a cross partition is dropped into a guideway, it is engaged by the next oncoming conveyor bar and propelled thereby lengthwise of the guideways toward the narrow ends thereof; and as they progress along the narrowing guideways they are gradually rotated, as illustrated in Figure 31, toward the upright posture which they must finally assume in order to enter the slots provided for their reception in the carton blanks.

The operations of the magazine dispensing plates 359 are timed so that the cross partitions are dropped one at a time into the guideways 378 between consecutive conveyor bars 346. It is essential that each and every dispenser discharge a partition into its associated guideway between each succeeding pair of conveyor bars so that each group of partitions arriving at the point of entry into the carton blank slots will comprise the requisite number for a complete carton.

A pusher mechanism 379 is utilized to positively urge the cross partitions into the slots of a medially folded blank held between the jaws of the vise G. Referring to Figures 33 to 36, the pusher mechanism comprises a head plate 380 supported by the standards 381 (see Figures 33 and 40) extending upwardly from brackets 382 fastened by suitable bolts 383 to the bed 28 of the complete apparatus. A shaft 384 freely mounted in brackets 385 carries the swingable arms 386 which depend therefrom to pivotally mount pusher arms 387 which carry the pusher bar 388 at their free ends. The latter bar has a downwardly depending lip or flange 389 forming a presser plate which is designed to slidably rest on the guiding surfaces 390 in the cut away portions 391 of the upper guides 354 previously described (see Figure 27). The arms 386 are spaced apart near their free ends by the fixed shaft 392 carrying the fixed arm 393 having a block 394 drilled to slidably receive the rod 395 extending therethrough from fixture to the presser bar 388. A suitable compression spring 395a is mounted on the rod 395 between the bar 388 and the block 394 whereby the arms 387 are normally positively urged downward for engagement of the presser plate 389 with the surfaces 390 of the guides 354.

In Figures 33 and 34 the pusher mechanism is shown in the fully advanced position corresponding to completion of the operation of inserting a group of cross partitions in the slot 18 of the carton blank as illustrated in Figure 34 where the cross partition 396 is shown urged to its final assembled position by the apparatus with respect to the line 397 representing the line of rest of the medially folded blank in the vise unit. In Figure 36 the pusher mechanism is shown in the retracted position. The actuating apparatus for this mechanism comprises an actuating rod 398 pivotally connecting to one of the arms 386 as at 399, the other end being threaded into the block 400 having a guide rod 401 extending therefrom for slidable support through the block 402 (Figure 33) pivotally mounted by bolt 403 on the bracket 404 forming a part of the reciprocating frame 405 which is slidably mounted by its slots 406 on bolts 407 fastened into the outer upper partition guide designated by numeral 354a (Figure 29). An engaging lug 408 extends downwardly from the free end of a swingable arm 409 pivotally mounted as at 410 on the reciprocating frame 405. The arm 409 carries a guide bracket 411 (Figures 34 and 36) having an engaging portion 412 extending laterally from its free end slidably over the upper surface 354b of the guide 354a to engage the cam block 413 on the latter as the reciprocating frame is moved to the position indicated in Figure 34 lifting the arm 409 against pressure of compression spring 414. The compression spring 414 is slidably mounted on the shank 415 which extends downwardly from bracket 416 of the reciprocating frame 405 for slidable relation through an enlarged hole (not shown) in the arm 409.

The engaging lug 408 is disposed just inside the drive chain 342 to be engaged by a crossbar 346 as the same proceeds in a direction toward the vise with the forward movement of the crossbar in engagement with the engaging lug 408. The reciprocating frame 405 is urged forward and by virtue of compression spring 417 causes the block 400 and the rod 398 to effect clockwise swinging movement of the arms 386 against the restraining action of the dashpot 418. The shaft 384 carrying arms 386 connects by means of a link 419 to one end of the dashpot 418, piston rod 420 of the latter pivotally connecting as at 421 to fitting 422 fastened to the plate 388. Bracket 404 mounts the control arm 423 having a step 424 of predetermined extent which is engaged by the actuating member 425 of the normally closed electrical switch means 426 mounted on plate 427 extending from connection to the block 400. If by reason of jamming of cross partitions upon entering into the vise, the forward movement of the arms 386 is resisted, this will allow depression of spring 417 and passage of the step 424 and the control arm 423 past the actuating member 425 of the switch 426 to actuate the latter and open an electrical circuit which includes the main drive motor L of the complete apparatus.

It will be apparent from the foregoing that the pusher mechanism is driven in accordance with the action of the anti-jamming device 423a determining whether advancing motion is transmitting thereto from the reciprocating frame 405. In turn, the reciprocating frame moves in accordance with the motion of crossbars 346 of drive chain 342 successively by reason of the engagement of each successively advancing crossbar with the engaging lug 408 of downwardly spring biased arm 409 of the frame (Fig. 34). When the frame has reached the desired limit of advancing travel, the arm 409 is raised by action of engaging portion 412 thereof over cam block 413, thus raising lug 408 out of engagement with a crossbar to permit the frame to withdraw under action of spring 428 until a following crossbar again engages lug 408.

The presser bar 389 is withdrawn from the position illustrated in Figure 34 to the position illustrated in Figure 36 by means of compression spring 428 mounted on rod 429 extending from fitting 430 on the reciprocating frame 405 and slidable through the bracket 431 mounted on the guide 354a. As the reciprocating frame is withdrawn the presser bar 389 must be lifted for clearance with following forwardly moving cross partitions. In this connection one of the arms 387 has a small roller 432 adjacent its free end and extending therefrom to fall within the guides 433 and 434 extending inwardly from the mounting plate 435 pivotally mounted as at 436 to a bracket 436a extending from the magazine base plate 352 (Figure 32). As the presser bar approaches the retracted position the roller 432 falls out of the guides 433 and 434 in the direction indicated by arrow B to fall onto the supporting lug 437 designed to support the presser bar at an elevation above the forwardly moving cross partitions. As the partitions arrive at a position forwardly of the presser plate 389 in this fully withdrawn position the engaging lug 408 will be engaged by a conveyor bar 346 to cause the reciprocating frame 405 to move forwardly and the roller 432 to fall off the supporting lug 437 and the arms 387 to rotate to a position such that the presser plate engages the surfaces 390 of the guides 354 under pressure of compression spring 395a.

As the arms 387 move forward the roller 432 will engage the lower depending portion 438 of the guide 434 raising the guides and mounting plate to the position indicated by numeral 439 and allowing the presser plate 389 to continue on its forward stroke after which the supporting plate 435 will fall back to the normal position illustrated in bold lines in Figure 35. During the retractive movement of the pusher mechanism the dashpot serves to dampen shock on the mechanism by causing a slight lag in the retractive action. Also by virtue of the dashpot the sensitivity of the mechanism to any undue pressure required for insertion of the cross partitions into the vise is enhanced by adjusting the dashpot to cause sufficient compression in spring 417 such that under the forwardly moving action it is at a value just less than would be required to allow the control arm 423 to actuate the switch 426. In this manner therefore, the pusher bar is sensitive to abnormal conditions arising in the insertion of cross partitions into a blank in the vise. If any difficulties arise in all practical cases this results in undue pressure having to be applied to the cross partitions to feed the same into the carton blank slots in which case the switch means 426 will be actuated to open the circuit of the main drive motor to shut down the complete apparatus thereby allowing the operator to rectify the condition.

Referring to Figures 40 to 45 apparatus is disclosed for lifting the carton blank after insertion of the cross partitions therein to effect the locking of the cross partitions into the blank in the manner illustrated in Figure 1g. A pair of spaced apart supports 440 (Figs. 42a and 42b) project from plate 380 and form an integral part of the casting of the depending guide member or plate 441 having guideway recesses 441a carrying at their outward ends the guide members 442 defining guide slots 442a designed to slidably accommodate the mounting bars 443. The upper ends of the mounting bars 443 are fastened to the yoke or crossbar 444, the arm 445 of which mounts the rack 446 driven in vertical reciprocating motion by the gear 447 (see also Figures 40, 42 and 43). An actuating arm 448 at one end mounts the yoke 449 having its tines 450 slidable over a sleeve 451 on the main drive shaft 29 and which carries the cam 452 engaging the cam roller 453 mounted on the yoke by a suitable pin 454. The other end of the arm 448 extends by the adjustable rod 455 to mount the rack 456 slidably guided in the guide block 457 mounted on bracket 458 fastened to angle 459 anchored to the standard 381. Bracket 458 carries shaft 460 which mounts gear 461 engaged by rack 456 and also carries gear 447 engaging rack 446. The upper arm 445 of the yoke 444 is slidably guided through the guide block 462 which extends from bracket 463 carrying flange 463a fastened to plate 380 by suitable bolts as indicated in Figure 43.

It is important to note that the mounting bars 443 carry mechanism for lifting the carton blank and also for holding the cross partitions depressed during the lifting operation so that the latter will remain stationary within the vise to effect the locking function formerly described with respect to Figure 1g. Thus the vertically reciprocable mounting bars 443 each carry a U-shaped bracket 464 mounting the common transverse shaft 465 which extends to mount the actuating arm 466 and carrying on its free end the roller 467. The shaft 465 in conjunction with each U-shaped bracket 464 rigidly mounts an arm 468 which connects by parallel spaced apart links 469 to a lifting bar 470 which is also pivoted intermediate its ends as at 471 to the U-shaped bracket 472 also fastened to the mounting bar 443. A suitable tension spring 473 connects between pivotal connection 474 of links 469 and pivotal connections 471 of the lifting bar 470.

In Figure 40 if the shaft 465 is rotated in a clockwise direction the lifting bars 470 will also be caused to rotate in a clockwise direction about their pivot points 471 to cause their engaging ends 475 to move away from the inner surfaces 476 of the mounting bars 443 corresponding to the open position.

Actuation of the lifting bars is provided through cam means 477 acting on the roller 467. Thus referring to Figure 42 these cam means are illustrated in the right hand portion of the figure and comprise a supporting plate 478 mounted in spaced apart relation from the plate 480 by suitable spacers 479. At the upper end the mounting plate 478 carries a riser plate 480 having an inclined face 481 extending downwardly and toward the surfaces of the mounting plate. A bracket 482 extends outwardly from the supporting plate 478 at the lower end thereof to pivotally mount the cam arm 483 which carries the cam plate 484, the upper end 485 of which normally is above and within close proximity to surface 481 of riser plate 480 due to tension spring 486.

As the arm 448 (Figure 40) reciprocates the rack 446 will be caused to vertically reciprocate causing vertical reciprocation of the mounting bars 443 and therefore shaft 465 wherefore from the position illustrated in Figure 42 the roller 467 will ride over the outward surface 487 of the cam plate 484 and the shaft 465 will be caused to rotate clockwise (Figures 44 and 45) whereby the lifting bars 470 rotate simultaneously to dispose their engaging ends 475 away from the surfaces 476 of the mounting bars. Substantially at the lower extremity of travel of the mounting bars the roller 467 will fall over the lower end 488 of the cam plate 484 and under tension of spring 473 the shaft 465 will rotate counter-clockwise whereupon the roller 467 will rest against the outer face of the mounting plate 478. In this position of the components the engaging ends 475 of the lifting bars 470 biased by springs 473 will pinch the upper regions of a carton blank against the outer surfaces of the mounting bars 443 (see Figures 44 and 45). As the latter are drawn upwardly the roller 467 rides along the outer surfaces of the mounting plate 478 until the upper limit of travel is reached at which point the roller 467 rises up the cam face 481 of the riser plate 480 at the same time deflecting the outer end 485 of the cam plate 484 to cause the arm 483, mounting the latter, to swing outwardly and counterclockwise in Figures 44 and 45 until the roller rides free of the cam plate 484 to the position shown in Figures 42 and 44. As soon as the roller 467 engages the cam face 481 of the riser plate 480 the engaging ends 475 of the lifting bars 470 will move outwardly releasing the carton blank.

As a carton blank is lifted while in the vise it is necessary to hold the cross partitions in the vise until they are fully locked in the carton blank (as indicated in Figure 1g). After this point has been reached the carton blank and cross partitions are bodily lifted upward to a position where all of the carton components are free from interference with the upper surfaces of the stationary head of the vise. Referring to Figure 41, restraining means 486a are shown and comprise spaced apart bracket members 487a extending from connection to each of the reciprocable mounting bars 443. Brackets 487a slidably mount the vertical guide rods 488a, which at their lower ends mount the downward depending feet 489 which carry a restraining bar 490 extending therebetween. A crossbar 491 extends between upper ends of the rods 488a and is connected thereto. A supporting bar 492 extends between brackets 487a and carries a centrally disposed upwardly extending rod 493 which extends for connection to a bracket 494 extending between the reciprocable mounting bars 443. The crossbar 491 is drilled to slidably receive the rod 493 and a compression spring 495 is disposed between the crossbar 491 and the bracket 494 to normally urge the restraining bar 490 downwardly with respect to the reciprocable mounting bars 443.

It will be observed that in Figure 41 the restraining bar 490 should be in slight spaced apart relation to the upper surfaces 496 of the stationary guide head 22 and in this connection adjusting means 497 are provided and comprise a bracket 498 extending from each of brackets 487a to mount the adjustable post 499 carrying an engaging pad 500 at the upper end thereof disposed to engage the crossbar 491.

*Progressive folding apparatus H*

Referring to Figures 46 and 50 it will be noted that the progressive folding apparatus H includes an initial transfer unit H1 at the entry end thereof which draws a raised blank with the cross partitions assembled therewith from the vise unit G and carries the same for continuous passage in progressive breaking and folding operations in the apparatus illustrated in Figures 49 and 50.

The initial transfer unit is mounted on the mounting plate 380 of the vise and comprises a bracket 501 fixed to the said plate and mounting the nipping roller 502 on shaft 503. The engaging surfaces 504 of this nipping roller are disposed by the mounting described substantially in alignment with the surfaces of the upstanding walls of the medially folded carton blank and a cooperating pinching roller 505 is controllably mounted for cooperating pinching action therewith. The roller 505 is mounted on a shaft 506 in a swingable bracket 507 having the mounting arm 508 thereof pivoted at its free end as at 509 to bracket 510 fastened to plate 380. Arm 508 is normally urged into an outward position such that pinching roller 505 is in spaced apart relation to roller 502 by compression spring 511 mounted on shaft 512 extending therefrom slidably through a hole (not shown) in the plate 380. Arm 508 also rotatably mounts the downwardly extending rod 513 which at its lower end pivotally connects to clevis 514 slidably mounting connecting rod 515 which mounts compression spring 516 and extends for integral connection with the yoke 517. Fingers 518 of yoke 517 slidably ride on a suitable sleeve 519 on main drive shaft 29, the latter carrying a cam 520 engaging roller 521 to cause reciprocating motion and swinging movement of the arm 508 about the pivot point 509. By virtue of common drive from the shaft 29 as between the vise and the initial transfer unit H1 the pinching rollers 505 and 504 will be spaced apart as a carton blank is lifted by the lifting bars 470 and when the latter are released in the manner previously discussed, the rollers 505 and 504 will be caused to engage the carton by reason of co-action of the contour of cam 520 with the roller 521.

A pair of feeding rollers 522 and 523 are mounted in conjunction with the guide plates 524 (Figures 49 and 50), the roller 522 being a driving roller and being mounted on shaft 525 which extends upwardly from mounting 526 (see Figure 46) and is driven by bevel gears 527 and shaft 528 which mounts sprocket 529 beyond the bracket 530. A chain 531 drives sprocket 529 from a sprocket 532 mounted on shaft 39 (see Figure 5). The roller 523 and superposed gear 523a are mounted on shaft 533 supported in pivotally mounted bracket 534 (Figure 49) pivoted as at 535 and having the arm 536 biased by tension spring 537. Arm 534 is pivotally mounted on a bracket 538 which extends upwardly from the base flange 539 of a guide plate 524 (Figure 50).

Superposed gear 523a meshes with superposed gear 522a of roller 522 and is thus driven by rotation of shaft 525. The rollers 502 and 505 described are designed to grip the upper portions of the carton blank whereas rollers 522 and 523 are disposed to grip the intermediate portions and in this connection extend through apertures 542 in the guide plates 524. The shaft 525 is also in drive connection with the sprocket 543 which drives chain 544 connecting to sprocket 545 driving roller 505 on shaft 506. Gear 546 on shaft 506 transmits the driving effect to gear 547 which in turn causes rotation of pinching roller 502. The gears driving feeding rollers 522 and 523, and pinching rollers 502 and 505 are designed such that slight separation of the gear teeth does not affect the drive relation.

In operation the pinching rollers 502 and 505 are continuously rotating but the latter is swung toward the roller 502 to engage a carton blank suspended by the lifting bars 470 above the vise. The pinching rollers engage substantially at the instant at which the lifting bars disengage and cause the carton blank to proceed forward to be initially fed into the unit H for folding operations. In Figure 48 means are illustrated for progressively nesting cross-partitions in a carton blank as the same is drawn through the transfer unit H1 of Figure 46 and pass to the progressive folding means of Figure 49. It is merely necessary to provide a leading presser member 547a made of sheet metal having a leading flange 547b designed to deflect one edge of the cross-partitions 20 progressively. A cooperating guide plate 547d may also be provided which lags the position of the leading flange 547b, the same being disposed adjacent the rollers 502 and 505 and mounted in any suitable manner on supporting plates 548 and 549 on standards 550 and 551. A pair of guide plates 524 are spaced apart to accommodate the conveyor chain 552 which mounts engaging lugs 553 designed to engage a blank and cause the same to be carried forward between the guide plates. Chain 552 is mounted on idler sprocket 554 fixed to shaft 555 freely mounted in bracket 556 adjacent the entry end of the unit H. From this sprocket the chain 552 continues over the idler 557 freely mounted on shaft 558 fixed between the guide plates 524 to dispose the upper span 559 of the chain at a conveying level between the guide plates. The other end of the upper span 559 passes over the large idler sprocket 560 downwardly to pass around the drive sprocket 561 which is mounted on shaft 562 beneath the guide plates. Shaft 562 is supported by brackets 563 and 564 and mounts the bevel gear 565 meshing with bevel gear 566 which is mounted on a shaft supported by bracket 567. These bevel gears are in drive connection through gear 568 with gear 569 which is rigidly mounted to the main drive shaft 29. Suitable guide means in the form of a longitudinally extending plate (not shown) are provided to support the upper span 559 of the chain 552.

The guide plates 524 are designed in their upper extent initially to have their upper edges 570 aligned with crease lines 13 of the carton blank (see Figure 1i). As the carton blank passes forward between the guide plates 524 means are provided for progressively breaking down the carton blank along its crease lines and folding the same. The edges 570 of the guide plates serve as anvils whereby an initial portion, defined as that portion of the carton blank above the crease line 13, may be folded as the blank moves forward. These means comprise the horizontally extending and downwardly inclined diverging bars 571 having a series of rollers 572 which preferably are in the form of conventional ballbearing races of about 1 inch outside diameter. The bars 571 are joined as at 573 to the supporting bar 574 which is mounted on supporting standards 575 which extend upwardly from the flanges of the guide plates 524. Crossbars 576 extend between the bars 571 and are suspended from bar 574 by the suspension members 577.

Proceeding forward through the guide plates 524 the assembled carton blank has its upstanding walls initially separated by the separator 578 on the free end of supporting rod 574 and the walls are parted by the rollers 572 on bars 571 progressively under forward motion so that the initial portion of the blank previously described is deflected downwardly to cause bending on the lines 13 thereof until the initial portions are disposed horizontally by rollers 572a to the form shown in Figure 1k. The carton in this form is carried past the step 579 in the guide plates to the secondary edges 580 which corresponds in height from the upper span 559 of the chain 552, to the crease lines 12 of the carton blank (see Figure 1i). A second pair of diverging presser bars 581 supported by the bar 574 extend horizontally and incline downwardly from a fitting 582 and engage the blank in its forward travel in a region between the crease lines 13 and 12 thereof to gently and progressively fold the same along the crease lines 12. The similar diverging rods 583 and 584 substantially complete the bending operation along the crease lines 12 and finally the rods 585 complete the folding operation by causing the secondary portions of the blank defined as those portions above the crease line 12 (see Figure 1j) to be disposed downwardly in the manner illustrated in Figure 1s.

In its finally folded state as above described the carton is supported by the guide plates 524 so that it is no longer necessary to provide support by the upper span 559 of the conveyor chain 552. It is only necessary to provide means for engaging the carton blank before the carton is free of an engaging lug 553 at the end of its travel with respect to its conveyance by the chain 552. Therefore, spaced at a distance less than the length of a carton blank from a vertical line passing through the axis of the idler gear 560 transferring rollers 586 are provided for engaging the blank and discharging the same onto the platform 587 of the stacker unit J. One transfer roller 588 is mounted above a gear 588a on shaft 589 in the transfer roller bracket 590. Gear 588a meshes with gear 592a on shaft 592b in bracket 591, the latter carrying suitable bevel gearing as in the case of bracket 526 of Figure 46 whereby sprocket 593 drives gear 588a. Sprocket 593 connects by a chain drive 594 to sprocket 595 on shaft 562. Gear 588a also transfers the driving effect to gear 596 disposed below roller 596a on shaft 597, the latter being supported by pivotally mounted bracket 598 pivoted as at 599 in the bracket 590 and having the arm 600 biased by a suitable tension spring 601.

*The stacker unit J*

In Figures 51 and 52 the stacker magazine 602 has an initial supporting floor piece 587 previously discussed connecting to the parallel spaced apart guides 603 joined at their ends by the cross piece 604 which is supported by the spaced standards 605 from the floor supporting the apparatus. The guides 603 are suitably fastened to the side brackets 606 extending upwardly from the bed 31 to mount the cross shaft 607 carrying arms 608 mounting the retaining arms 609. Shaft 607 also carries a lever 610 pivotally connected to the link 611 connecting by the pivot 612 to a hinged arm extending upwardly from rigidly mounted bracket 613. A connecting rod 614 also connects to the pivot 612, the other end thereof carrying a bifurcated yoke 615 having fingers slidably embracing a sleeve (not shown) on the main drive shaft 29 and having a roller 616 engageable with the cam 617. The weight of arms 608 results in positive engagement of the roller 616 with the cam 617, the cam being so positioned that after an assembled and folded blank has been inserted into the magazine along the through path line 618 and urged transversely into the magazine, the retaining arms 609 will be dropped to hold the stack within the magazine against the movable stacking plate 619.

The stacking plate 619 extends across the magazine and is mounted on the carriage 620 which is carried by rollers 621 and 622 engaging the lower flanges 623 of the guides 603. A cable 624 is fastened to the carriage as at 625 and passes about the pulley 626 on brackets 627 extending for passage around pulleys 628 and 629 on standard 605a and about the pulley 630 on counterweight 631 to a point of anchorage 632. The weight 631 normally urges the stacking plate 619 in a direction toward the through-path line 618.

A stacker head 633 is utilized for stacking the carton blanks within the magazine and comprises the stacker plate 634 having clearance slots 634a for the arms 609 and mounted on the extending mounting bars 635 supported by bracket 636 carried by the guide plate 637 slidably mounted in the guide frame 638 fastened to the bed 31. Bracket 636 pivotally connects by the connecting arm 639 to the link 640 hinged at its opposite end to the bracket 641 and connecting from the intermediate point 642 by way of connecting arm 643 to the yoke 644 slidably fitting over the eccentric 645 driven by the main drive shaft 29. The eccentric 645 causes swinging movement of the link 640 and reciprocating movement of connecting arm 639 and the stacker plate 634.

In operation the transferring rollers 586 discharge an assembled and folded carton blank in knocked-down form into the magazine along the through-path line 618 and simultaneously the kicker arm 646 swings to urge the carton fully into the magazine against the flange 647. The arm 646 is pivotally mounted on an upstanding shaft 648 and has its secondary arm portion 649 pivotally connected as at 650 to the actuating arm 651 connecting to swingable arm 652 as at 653. The arm 652 is pivotally connected to a bracket (not shown) mounted on the bed 31 and carries a roller 654 engaging the cam 655 driven by shaft 29. A suitable tension spring 656 is provided for insuring positive engagement of roller 654 with cam 655 and therefore, it will be observed that arm 646 in its actuating movement is urged under tension of spring 656 but is withdrawn in accordance with the contour of cam 655.

Automatic counting means are incorporated in the stacker and are illustrated in Figures 53 to 55. Brackets 657 and 658 extending from bed 31 freely mount shaft 659 carrying the ratchet wheel 660 having an actuating lug 661 with a sloped face 661a thereon. A counter arm 662 swingably mounted as at 663 to bracket 658 has an enlarged hole 664 receiving the limiting rod 665 extending from the flange 647 of stacker magazine 602 (see Figure 51) in line with the through path line 618. At the remote end thereof the counter arm 662 mounts a stop member 666 but in the normal position of rest of arm 662, as illustrated in Figure 54, the stop member is free of engagement with an edge 667 of an assembled and folded carton blank 668 in knocked-down form which has been inserted into the magazine in the manner previously described. The arm 662 mounts an actuating lug 669 extending for engagement with the lug 661 at one point during each revolution of the ratchet 660. An actuating arm 670 having a pawl 671 for engaging the teeth 672 of ratchet 660 is pivotally connected to link 673 actuated by the armature of a solenoid 674. The arm 670 is pivotally connected to the arm 675 as at 676 which extends from shaft 677 in bracket 678. In Figure 51 it will be observed that shaft 677 extends to rigidly connect to the swingable arm 640 so that movement of the latter arm causes corresponding swinging movement of arm 675 and the forward thrust of arm 670 about the pivotal connection 679 of link 673. Vertical reciprocating movement of the pivotal connection 679 is determined by actuation of the solenoid 674 thereby determining engagement of the actuator 671 independent of movement of the arm 670. The solenoid 674 is actuated by the normally open switch means 680 (Figure 51) having the actuating arm 681 designed to be depressed by a carton in knocked-down form as the latter is urged forward in the magazine of the stacker by the stacker plate 634 which mounts the switch means 680.

If for some reason, a carton in knocked-down form does not arrive in the stacker along the through path line 618 at a moment corresponding to the forward counting movement of the arm 670 in conjunction with the ratchet 660, the solenoid will not be energized and the ratchet will not be turned since the actuator 671 of arm 670 will move clear of the ratchet teeth 672. The ratchet 660 is restrained in a conventional manner by means of a suitable leaf spring 682 (Figure 53) and under normal feed of assembled carton blanks into the stacker unit and reciprocating movement of the stacker head 633, the ratchet wheel 660 will be caused to rotate in increments corresponding to the number of assembled blanks inserted. Once in every revolution of the ratchet 660 and corresponding to one increment of rotation thereof, the lug 661 engages the actuator bar 669 of counter arm 662 causing the stop member 666 to be disposed in the position illustrated in Figure 55 so that the kicker arm 646 will cause the assembled carton blank to be urged into the stacker magazine to a position out of alignment with the normally stacked cartons 684 as illustrated by position of the carton 685 partially shown. The worker in removing the stacked cartons from the stacker may therefore readily ascertain groups of stacked cartons since such will be de-marked by observing mis-aligned cartons defining groups, each of which contain a number of cartons corresponding to the number of ratchet teeth 672.

*Solenoid actuated clutch P*

As previously described with reference to the conveying mechanism of the cross partition magazine unit the conveying mechanism is driven through a solenoid actuated clutch device whereby cross partitions are fed into the vise G only if a carton blank has been fed into the latter from the transfer unit F.

Referring to Figures 56 to 59 it will be observed that shaft 39 is mounted in brackets 686 and 40 and at one end carries a bevel gear 687 engaging a bevel gear 688 in connection 35 to the main drive shaft 29 (see also Figure 5). As previously described the shaft 39 carries sprocket 532 driving the initial transfer unit HI (see Figure 47). Shaft 39 carries a clutch wheel 689 causing continuous rotation of the same in direct ratio with the rotation of the main drive shaft 29. A driven wheel 690 is mounted in parallel spaced apart relation to wheel 689 and axially in alignment therewith being in drive connection with the driven shaft 34 (Figure 5), which is mounted in brackets 691 and 38. The driven wheel 690 carries on its face adjacent its periphery the locking lug 692. A disengaging cam member 693 of a width less than the thickness of the driven wheel is mounted on rods 694 slidable in fittings 695 of bracket 691. An actuating link 696 extends to pivotally connect to lever 697 which is mounted on an arm 698 of bracket 691 by a suitable pin 699. The lower end of the lever 697 carries the flange 700 which is slotted to slidably fit over a crossbar 701 connecting the actuating rods 702 and 703 and engages collars 702a and 703a fixed to the rods. The solenoids 704 and 705 are provided for withdrawing the actuating rods 702 and 703 when energized.

A latch arm 706 pivoted as at 707 to the clutch wheel 689 carries a roller 708 disposed toward the driven wheel 690 to ride the periphery thereof. As illustrated in Figure 57, the roller 708 is of a width considerably less than the thickness of the driven wheel 690 so that in the normal position of the disengaging cam member 693 shown in the same figure, the roller 708 is free to pass around and maintain contact with the periphery of the driven wheel. The latch arm is biased by a spring 709 about its pivot point 707 in the direction appropriate to cause the roller 708 to engage the periphery of the driven wheel. The compression spring 709 is mounted on rod 710 pivotally connected to the latch arm 706 as at 711 and to the driving wheel 689 as at 712. The latch arm 706 is cut away as at 713 to form a latching notch, the latch arm itself being disposed in the space between the driving and driven members so that as the driving member 689 rotates in direction R (Figure 58 and 59) the roller 708 will follow the periphery of the driven wheel and the locking notch 713 of the clutch will find the locking lug 692 of the driven wheel causing rotation of the latter and of the driven shaft 34. It will be apparent that if for any reason the latch arm 706 were to be disengaged from the locking lug 692 shaft 39 would complete one revolution before the clutch member became again engaged with the locking lug. The components illustrated therefore form a type of one-revolution clutch.

In normal operation where carton blanks are passed by the transferring unit F to the vise G the solenoid 705 will be energized in a manner to be more particularly described and the clutch will be engaged, that is to say, the latch arm 706 will be engaged with the locking lug 692 for drive relation between shafts 39 and 34. The solenoid 704 is electrically associated with switch means (to be described) in conjunction with the transfer unit F whereby the solenoid 704 will be energized and the solenoid 705 de-energized should a carton blank fail to be passed by this transfer unit to the vise. In such instance, the actuating rod 702 will be drawn into the solenoid 704 (dotted lines in Figure 57) causing counterclockwise movement of the lever 697 and movement of the disengaging cam member 693 into the path of the roller 708 as illustrated by a dotted line position 714. In this latter position the clutch is uncoupled since the roller 708 will pass over the disengaging cam member causing the notch 713 of the latch arm 706 to swing free of the locking lug 692 on its pivot 707. The driven wheel 690 and shaft 34 will come to rest due to friction in the mechanism very quickly whereby the locking lug 692 will be disposed adjacent the disengaging cam member 693.

So long as no further cartons are fed through the transferring unit F toward the vise the shaft 39 will continue to rotate along with the driving member 689 but upon each rotation of the latter, the latch arm 706 will be moved free of engagement with the locking lug by its roller 708 passing over the outer contour of the disengaging cam member 693. As soon as a carton blank passes through a transfer unit F the solenoid 705 will again be energized and the solenoid 704 de-energized in a manner yet to be described and the disengaging cam member 693 will be drawn back to its normal position illustrated in bold lines in Figure 57 with attendant operations previously discussed whereby the notch 713 of the latch arm 706 will engage the locking lug 692 and cross partitions will again be fed to the vise.

*Electrical circuit arrangements*

Figure 60 shows the electrical circuit for the drive motor L for the apparatus described and which is connected to the source of electrical power 715 in series with a plurality of control switches, one of which is a master control switch 716 of conventional design. Other hand operated switches 717 and 718 are appropriately located about the apparatus so that the operator may quickly cause operation to be stopped should any difficulty arise in any of the units discussed. As described with reference to Figure 13 in the sub-unit C2, a micro-switch or sensitive switch means 133 is shown disposed in series in the main drive motor circuit such that according to the adjustment of the unit C2, if more than one carton blank at a time passes between the rollers thereof, switch 133 will be opened shutting down the apparatus. Referring also to Figures 34 and 36 where the switch 426 is illustrated and wherein the functions of the same have been previously described, it will be recalled that this switch is caused to open in the event jamming occurs in feeding cross partitions into the vise. In Figure 60 the switch 426 is shown in series relation in the electrical circuit of the drive motor.

Various control switch means are utilized for stopping the feed of cross partitions in conjunction with the clutch device P previously discussed and in opening the circuit of the drive motor where the cartons become bunched or follow too closely upon one another in the folding unit H. The electrical circuit arrangements pertinent to these functions are illustrated in Figure 61 wherein the source of electrical power 719 is shown serving the normally energized solenoid coil 705 and the normally deenergized solenoid coil 704 through the double-pole, double-throw relay device 720. The latter device is diagrammatically illustrated and comprises the switching member 721 movable by the armature 722 and normally closing the electrical circuit of the solenoid 704 by engaging contacts 723 and 724. Armature 722 also operatively controls the position of the switching member 725 which is shown in the open position with respect to the contacts 726 and 727 and controlling energization of solenoid 705. Armature 722 passes through a solenoid coil 728 which is electrically in parallel with a further solenoid coil 729 each of which has a controlling switch 730 and 731 respectively. Armature 722 carries a locking member 732 which, when drawn upward against the force of gravity or against the force of a suitable spring (not shown) as the case may be, by the energization of the coil 728, allows the retaining member 733 to engage under the shoulder 734 thereof to hold the same in a position whereby the switching member 725 closes the circuit of the solenoid 705 and the upper switching member 721 is in a position opening the circuit of the solenoid 704.

When the solenoid coil 729 is energized the retaining member 733 mounted on its armature 735 is withdrawn against the tension of spring 736 and the armature 722 is allowed to drop to the normal position illustrated in Figure 61 but in such instance, the switch 730 must be open.

The coils 728 and 729 are energized by direct current derived from a step-down transformer 737 having its primary winding connected to the source 719 as illustrated wherein the secondary winding connects to the full wave rectifier 738. The output of the rectifier is fed by lines 739 and 740 with a suitable voltage sustaining condenser 741 thereacross to the common connection 742 of the coils and the switch arms of the switches 730 and 731 as illustrated.

Referring to Figure 23, the switch device 730 is illustrated having a switching member 743 shown disposed in the normal position corresponding to the open position of the switch. As the member 743 is deflected by a carton blank to the position designated by numeral 745, the switch will be closed to close the circuit of the solenoid 728 whereby the solenoid 705 will be energized since the armature 722 will be withdrawn causing the switching member 725 to engage contacts 726 and 727 and at the same time the solenoid 704 will be de-energized so that the operative condition of the clutch P will be that illustrated in Figure 57 corresponding to drive relation between shafts 39 and 34. The solenoid 705 will continue to be energized since the locking member 732 of the armature 722 will be held in a fixed position by the retaining member 733. This latter retaining member remains in its retaining position until the solenoid 729 is energized by closing of switch 731. Referring also to Figures 25 and 26 adjacent the unit G, a cam 746 is shown mounted on main drive shaft 29 having a cam hump 747 designed to engage the switch arm 748 once during each revolution thereof to cause the switch 731 to be closed electrically. The radial position of the hump 747 of the cam 746 corresponding to actuation of the switch arm 748 is synchronized mechanically to drive relation with the position of lug 223 (Figure 19) in urging a carton blank through into the transferring unit F. In this manner, therefore, the switch 731 will be closed at repeated intervals and the progress of the carton blank in actuating the switch means 730 will cause closure of switch means 730 during a period which includes the time of closure of the switch 731. Therefore, if for any reason, the switch 730 is not closed by a carton blank proceeding toward the vise, switch means 731 will be closed and coil 729 energized to release the retaining member 733 from the locking member 732 and the armature 722 will drop to open the circuit of solenoid 705 and close the circuit of solenoid 704 whereby the clutch P will be disengaged in the manner formerly discussed.

It will be apparent that if during the period that the coil 728 is energized, the retaining member 733 is withdrawn by closure of switch 731, the armature 722 will still remain in the upward position but before the switch arm 743 (Figure 23) of switch 730 is released from engagement with the carton blank, the switch means 731 will be opened and it is for this reason that the hump 747 (Figure 26) is of small circumferential extent.

Means are included in conjunction with the folding unit H for shutting down the apparatus in the event that cartons, during folding operations, follow too closely upon one another by reason of jamming in the folding unit.

Thus, referring to Figures 61 and 49 normally open switches 749 and 750 are disposed such that their switch arms 749a and 750a respectively are spaced apart a distance greater than the length of a carton body. Therefore, in normal operation, only one switch can be closed at a time due to passage of blanks during the folding operations through the folding unit H. In the event that one carton follows closely upon the other, which is a condition arising during jamming, both such arms will be deflected by different cartons. In Figure 61 the switches 749 and 750 are shown connected electrically in series with the solenoid coil 751 across the lines 739 and 740 carrying direct current voltage derived from the rectifier 738. The solenoid 751 will be energized when both switches 749 and 750 are closed thereby raising its armature 752 and relieving the switch element 753 thereof from engagement with contacts 754 and 755 which, upon referring to Figure 60 will be noted, opens the main motor drive circuit. Therefore, if jamming occurs in the folding unit, the whole mechanism will be shut down.

In conjunction with the counter device previously discussed with reference to Figures 53 to 55 and the stacker unit in Figures 51 and 52, switch means 680 were then described as serving to cause actuation of the solenoid 674. In Figure 61 the solenoid coil is designated by the latter numeral for clarity and is shown in series relation with switch means 680 across the output from the rectifier 738. In accordance with the arrangement shown the solenoid 674 will be actuated only if the switch 680 is closed and this occurs only when the stacker head 633 moves forward engaging an assembled carton in knocked-down form causing the switch arm 681 to be deflected as the carton is urged into the stacker magazine.

Having regard to the desirability of setting forth a specific construction of apparatus to more clearly disclose the nature of this invention it will be appreciated that there is no intention of voluntarily limiting the scope of this specification except as may be indicated by the following claims.

What I claim as my invention is:

1. Apparatus for inserting cross partitions through slots in a carton blank, comprising: a vise having a stationary jaw and a movable jaw cooperable with said stationary jaw for clamping the carton blanks, one at a time, in position to receive the cross partitions, a plurality of cross-partition guideways extending perpendicularly to the blank-engaging faces of said jaws and corresponding numerically to the slots per carton blank designed to receive the cross partitions, said guideways each terminating at one end at the blank engaging face of said stationary jaw at positions corresponding with those of the aforementioned slots, individually, each of said guideways being but slightly wider at the end adjacent said vise than the thickness of a cross-partition and of progressively increasing width toward the end remote from said vise, the end portion of each guideway remote from said vise being of greatly increased width, as compared to the width thereof adjacent said vise, the increased width, however, being substantially less than the height of one of said cross-partitions, said guideways, collectively, being progressively variant in length, a plurality of magazines each disposed above and at one side of the wide end portion of one of said guideways, individually, dispensing mechanisms individual to said magazines, each operative in response to a single actuation thereof to drop one cross partition into its associated guideway, means operative in timed relation to the movements of said movable jaw for actuating said dispensing mechanism, and continuous conveyor means movable lengthwise through said guideways and operative to engage the cross partitions therein individually and to move the same in uniformly spaced succession toward said vise, said guideways each being operative by virtue of its progressively variant width to rotate the cross partition therein from an inclined posture to a substantially vertical posture.

2. Apparatus in accordance with claim 1 wherein said continuous conveyor means comprises a pair of laterally spaced parallel chain belts located at either side of the group of guideways, together with sprockets for said belts, and a series of bars bridged across and carried by said belts, said bars extending through said guideways, transversely thereof, the spacing between successive ones of said bars being substantially uniform and sufficient to admit one cross partition therebetween.

3. Apparatus in accordance with claim 1 including, additionally, a pusher bar located adjacent said vise and above said guideways and extending across said guideways collectively, means for reciprocating said pusher bar toward and away from said vise synchronously with the movements of said conveyor bars, and cam means operative to lift said pusher bar during each retractive movement thereof, said pusher bar being operative to engage each successive group of cross partitions arriving at the discharge end of the group of guideways and to propel the same forwardly through the carton blank slots.

4. Apparatus in accordance with claim 1, including, additionally, a pusher bar located adjacent said vise and above said guideways and extending across said guideways collectively, means for reciprocating said pusher bar toward and away from said vise synchronously with the movements of said conveyor bars, and cam means operative to lift said pusher bar during each retractive movement thereof, said pusher bar being operative to engage each successive group of cross partitions arriving at the discharge end of the group of guideways and to propel the same forwardly through the carton blank slots, said means for reciprocating said pusher bar including a spring for retracting the same and an element engageable by each successive conveyor bar for advancing said pusher bar.

5. Apparatus in accordance with claim 1, comprising a cam operative at the end of each forward stroke of said pusher bar to disengage said element from the propelling conveyor bar.

6. Apparatus in accordance with claim 1, comprising a pair of spaced parallel depending arms fulcrumed at their upper ends, a second pair of arms carried by and fulcrumed respectively at the distal ends of said first-mentioned arms, said pusher bar being carried by said second arms, jointly, and bridged between the distal ends thereof, spring means biasing said pusher bar upwardly, said cam means being of the gate type and thus operative to depress said pusher bar during each forward stroke thereof while permitting said pusher bar to rise at the end of each forward stroke and to remain in elevated position to the end of each retractive stroke.

7. Apparatus for inserting cross partitions through slots in carton blanks, comprising: a vise having a stationary jaw and a movable jaw cooperable with said stationary jaw for clamping the carton blanks, one at a time, in position to receive the cross partitions, a plurality of cross partition guideways extending perpendicularly to the blank-engaging faces of said jaws and corresponding numerically to the carton-blank slots designed to receive the cross partitions, said guideways each terminating at one end of the face of one of said jaws, dispensing means operative to deposit cross partitions, one at a time, in each of said guideways, a continuous belt conveyor having a portion extending parallel to said guideways, said conveyor including a plurality of bars extending transversely thereof and equally spaced lengthwise of the conveyor, said bars being arranged to extend through said guideways, transversely thereof and to move along said guideways in continuous succession, said bars being operative to engage and propel the cross partitions along said guideways, the arrangement being such that each said bar, as it moves along said guideways, propels a cross partition along each guideway to the end thereof adjacent said vise, and pusher mechanism common to said guideways and operative to propel each successive group of cross partitions through the slots of a carton blank within said vise, said groups of carton partitions having first been delivered, in each instance, by said conveyor to the ends of the guideways adjacent said vise, said pusher mechanism including a bar overlying and extending transversely of said guideways, means for reciprocating said pusher bar lengthwise of said guideways in timed relation with the movement of said conveyor so that each group of partitions is propelled thereby into the slots of a carton blank, and cam means for elevating said pusher bar during each retractive stroke thereof to clear the group of partitions next in order for insertion into a carton blank, said cam means being effective to retain said pusher bar in elevated position only until said pusher bar has been retracted sufficiently to clear the trailing ends of the said group of partitions.

8. Apparatus in accordance with claim 7 including a carriage supporting said pusher bar and reciprocable lengthwise of said guideways, a pivoted arm mounted on said carriage and movable therewith and having means for engaging said conveyor bars individually and consecutively, thereby coupling said carriage to said conveyor to effect forward movement of the carriage, cam means operative to disengage said arm from the conveyor at the end of each forward stroke thereof, and spring means operative to retract said carriage when the same is released.

9. Apparatus for inserting cross partitions through slots provided therefor in carton blanks, comprising: a vise operative to receive and hold the carton blanks, one at a time, in position to receive the cross-partitions, a plurality of guideways, each aligned at one end with the location in said vise of one of said carton blank slots, individually, and each having its said end terminating at said vise, means for feeding a succession of cross partitions into each of said guideways, one at a time per guideway, at predetermined time intervals, a conveyor operative to propel said cross partitions along said guideways so that they arrive at a station immediately adjacent said vise in consecutive groups of one per guideway, and supplemental mechanism operative to propel each consecutive group of cross partitions into the carton blank slots immediately following arrival of each such group at said station, said supplemental mechanism including cross partition engaging means reciprocable lengthwise of said guideways, and means for reciprocating said cross partition engaging means in such timed relation with said conveyor that each forward stroke thereof occurs immediately following arrival of a group of cross partitions at said station.

10. Apparatus in accordance with claim 9 wherein said conveyor includes a series of spaced bars extending transversely of and through said guideways and continuously movable along said guideways for propelling the cross partitions, and wherein said cross partition engaging means is actuable by each of said bars consecutively to propel forwardly into said slots a group of cross partitions.

11. In a machine for assembling knocked-down cartons, a unit operative to receive and hold slotted carton blanks, one at a time in succession, mechanism for feeding a group of cross partitions into the slots of each successive carton blank, said mechanism including a rotary driving clutch comprising a driving member and a driven member, each complete revolution of said driven member coinciding with one complete cycle of operation of said feeding mechanism, electrically-operated clutch control means effective to engage and disengage said clutch driving and driven members, a circuit for said clutch control means including a normally open electromagnetically-operated switch having an actuating coil, transfer means for feeding carton blanks to said unit, one at a time, a second normally open switch associated with said transfer means and adapted to be momentarily closed by each carton blank as it approaches said unit, thereby energizing the actuating coil of said electromagnetically-operated switch and resultantly putting said clutch into driving condition through the operation of said clutch control means, latch means operative to retain closed said electromagnetically-operated switch, an electromagnet operative, when energized, to deactuate said latch means, a circuit for said electromagnet, a third normally open switch included in said last-mentioned circuit, and means for closing said third switch cyclically, the cyclic closures of said third switch each being momentary and each occurring during a period when said second switch is either closed or would be closed except for failure of a carton blank to arrive at a predetermined position enroute to said unit, said latch means being effective to keep the circuit of said electromagnetically-operated switch closed continuously so long as carton blanks continue to arrive at said unit at predetermined intervals, the arrangement being such that said clutch is automatically disengaged upon failure of a carton blank to arrive at said unit in time to receive a group of cross-partitions which is in readiness to be fed into said unit, the disengagement of said clutch being effective to forestall the feeding of cross-partitions when there is no carton blank in position to receive them.

12. The combination set forth in claim 11 wherein said clutch control means comprises a first solenoid connected in circuit with said electromagnetically-operated switch and operative, upon energization, to effect intercoupling of said clutch members, a second solenoid having an energizing circuit and operative, upon energization, to effect disengagement of said clutch members, said electromagnetic switch being operative to open and close the circuits of said first and second solenoids alternately.

13. The combination set forth in claim 11 wherein said clutch includes a latch normally intercoupling said driving and driven members, and a cam movable by said solenoids between two alternate positions, said cam being operative in one only of said positions to deactuate said latch and thereby uncouple said driving and driven members.

14. In apparatus for inserting cross partitions through slots in carton blanks, the combination of, means for supporting a slotted carton blank, means for feeding a carton blank to said supporting means, a main drive shaft for driving said feeding means, a cross partition dispensing mechanism including continuous conveyor means for feeding cross partitions to a carton blank in said supporting means, means including a clutch for coupling the main drive shaft to said conveyor and said dispensing mechanism, electrical pulse responsive means for causing engagement and disengagement of said clutch, means associated with said main drive shaft for generating an electrical pulse in synchronism with the rotation of said shaft, means operative by said pulse responsive means for disengaging said clutch responsive to said synchronous pulses, means including an electrical switch for generating another pulse when a carton blank is fed into said supporting means, and means actuable by said pulse responsive means to cause engagement of said clutch by said other pulse.

15. In apparatus for inserting cross partitions through slots in carton blanks, the combination claimed in claim 14, in which the pulse responsive means comprise a pair of actuating solenoids, and the pulse generating means comprise a switching solenoid and a controlling solenoid disposed in parallel across a source of electrical energy, a separate source of electrical energy connecting said actuating solenoids in parallel, and switch means actuable by said switching solenoids and opening the electrical circuit of one of said actuating solenoids and closing the electrical circuit of the other to energize the latter when the switching solenoid is de-energized, said energized actuating solenoid providing disengagement of said clutch, the circuit of said switching solenoid being closed by actuation of the electrical switch when actuated by a carton being fed into said supporting means to cause de-energization of the energized actuating solenoid and energization of the other, said other solenoid serving to engage said clutch, means actuated by said controlling solenoid for retaining the switch means actuated by said switching solenoid in positions corresponding to the energization of the latter, said synchronous pulse generating means including a switch electrically in circuit with said controlling solenoid to govern energization thereof to release said retaining means and cause the clutch engagement actuating solenoid to be de-energized and the clutch disengagement actuating solenoid to be energized.

16. In apparatus for forming and assembling egg cartons wherein the latter are of the class formed from a medially folded carton blank having slots adapted to receive a plurality of cross partitions, and the upstanding walls of the medially folded blank are folded to overlie the cross partitions arranged in nested relation within the slots thereof, the combination comprising; means for supporting a slotted carton blank in medially folded position, a cross partition feeding mechanism for feeding cross partitions to the slots of a carton blank in said supporting means, and including means for conveying cross partitions continuously toward a slotted blank resting in said supporting means, means for positively urging cross partitions into the slots of the slotted blanks, actuating means for said positively urging means having an engaging member engageable by said conveying means when said positively urging means are in a position disposing cross partitions in assembled relation in the slots of the carton blank, and spring means for returning said positively urging means and said engaging member to a position where the latter is engageable by said conveying means.

17. In apparatus for forming and assembling egg cartons, the combination claimed in claim 16 in which the positively urging means includes a pressure sensitive mechanism, embodying electrical switch means, a main drive motor for the apparatus in electrical circuit arrangement with said switch means and controllable by the latter whereby the electrical circuit of the main drive motor is open when undue pressure is exerted against said positively urging means.

18. In apparatus for forming and assembling egg cartons, the combination as claimed in claim 16 in which the positively urging means comprise, a supporting shaft transversely disposed above said conveyor means, arms fixed to said shaft and depending therefrom, links extending from the free ends of said arms and a pusher bar extending between the free ends of said links, guide means disposed adjacent the free end of one of said arms and a roller associated with the latter engageable in said guide means to control swinging movement of said pusher bar relative to the free ends of said arms, said guides being formed to provide swinging movement of said pusher bar upwardly and downwardly free of cross partitions being fed by said conveying means when said positively urging means are withdrawn.

19. Apparatus in accordance with claim 1 wherein said continuous conveyor means comprises a pair of laterally spaced parallel chain belts located at either side of the group of guideways, together with sprockets for said belts, and a series of bars bridged across and carried by said belts, said bars extending through said guideways, transversely thereof, the spacing between successive ones of said bars being substantially uniform and sufficient to admit one cross partition therebetween, a pusher bar located adjacent said vise and above said guideways and extending across said guideways collectively, means for reciprocating said pusher bar toward and away from said vise synchronously with the movements of said conveyor bars, and cam means operative to lift said pusher bar during each retractive movement thereof, said pusher bar being operative to engage each successive group of cross partitions arriving at the discharge end of the group of guideways and to propel the same forwardly through the carton blank slots.

20. Apparatus in accordance with claim 1 wherein said continuous conveyor means comprises a pair of laterally spaced parallel chain belts located at either side of the group of guideways, together with sprockets for said belts, and a series of bars bridged across and carried by said belts, said bars extending through said guideways, transversely thereof, the spacing between successive ones of said bars being substantially uniform and sufficient to admit one cross partition therebetween, a pusher bar located adjacent said vise and above said guideways and extending across said guideways collectively, means for reciprocating said pusher bar toward and away from said vise synchronously with the movements of said conveyor bars, and cam means operative to lift said pusher bar during each retractive movement thereof, said pusher bar being operative to engage each successive group of cross partitions arriving at the discharge end of the group of guideways and to propel the same forwardly through the carton blank slots, said means for reciprocating said pusher bar including a spring for retracting the same and an element engageable by each successive conveyor bar for advancing said pusher bar.

21. Apparatus in accordance with claim 1 wherein said continuous conveyor means comprises a pair of laterally spaced parallel chain belts located at either side of the group of guideways, together with sprockets for said belts, and a series of bars bridged across and carried by said belts, said bars extending through said guideways, transversely thereof, the spacing between successive ones of said bars being substantially uniform and sufficient to admit one cross partition therebtween, and a cam operative at the end of each forward stroke of said pusher bar to disengage said element from the propelling conveyor bar.

22. Apparatus in accordance with claim 1 wherein said continuous conveyor means comprises a pair of laterally spaced parallel chain belts located at either side of the group of guideways, together with sprockets for said belts, and a series of bars bridged across and carried by said belts, said bars extending through said guideways, transversely thereof, the spacing between succesive ones of said bars being substantially uniform and sufficient to admit one cross partition therebetween, and comprising a pair of spaced parallel depending arms fulcrumed at their upper ends, a second pair of arms carried by and fulcrumed respectively at the distal ends of said first-mentioned arms, said pusher bar being carried by said second arms, jointly, and bridged between the distal ends thereof, spring means biasing said pusher bar upwardly, said cam means being of the gate type and thus operative to depress said pusher bar during each forward stroke thereof while permitting said pusher bar to rise at the end of each forward stroke and to remain in elevated position to the end of each retractive stroke.

23. The combination set forth in claim 11 wherein said clutch control means comprises a first solenoid connected in circuit with said electromagnetically-operated switch and operative, upon energization, to effect intercoupling of said clutch members, a second solenoid having an energizing circuit and operative, upon energization, to effect disengagement of said clutch members, said electromagnetic switch being operative to open and close the circuits of said first and second solenoids alternately, and wherein said clutch includes a latch normally intercoupling said driving and driven members, and a cam movable by said solenoids between two alternate positions, said cam being operative in one only of said positions to de-actuate said latch and thereby uncouple said driving and driven members.

24. In apparatus for forming and assembling egg cartons, the combination claimed in claim 16 in which the positively urging means includes a pressure sensitive mechanism, embodying electrical switch means, a main drive motor for the apparatus in electrical circuit arrangement with said switch means and controllable by the latter whereby the electrical circuit of the main drive motor is open when undue pressure is exerted against said positively urging means, and in which the positively urging means comprise, a supporting shaft transversely disposed above said conveyor means, arms fixed to said shaft and depending therefrom, links extending from the free ends of said arms and a pusher bar extending between the free ends of said links, guide means disposed adjacent the free end of one of said arms and a roller associated with the latter engageable in said guide means to control swinging movement of said pusher bar relative to the free ends of said arms, said guides being formed to provide swinging movement of said pusher bar upwardly and downwardly free of cross partitions being fed by said conveying means when said positively urging means are withdrawn.

JOHN GILCHRIST.

References Cited in the file of this patent

UNITED STATES PATENTS

| Number | Name | Date |
|---|---|---|
| 912,087 | Dempsey | Feb. 9, 1909 |
| 1,123,945 | Staude | Jan. 5, 1915 |
| 1,646,883 | Sheldrick | Oct. 25, 1927 |
| 1,701,861 | Nilblack | Feb. 12, 1929 |
| 1,845,456 | Wagner | Feb. 16, 1932 |
| 1,970,550 | Benoit | Aug. 21, 1934 |
| 1,993,915 | Brown | Mar. 12, 1935 |
| 2,018,621 | Becker | Oct. 22, 1935 |
| 2,024,201 | Benoit | Dec. 17, 1935 |
| 2,089,946 | Davidson | Aug. 17, 1937 |
| 2,099,820 | Meyer | Nov. 23, 1937 |
| 2,195,916 | Brown | Apr. 2, 1940 |
| 2,196,982 | Cox | Apr. 16, 1940 |
| 2,258,880 | Bobst | Oct. 14, 1941 |
| 2,267,415 | Myers | Dec. 23, 1941 |
| 2,269,473 | Nordquist | Jan. 13, 1942 |
| 2,382,998 | Kleinschmidt | Aug. 21, 1945 |
| 2,393,683 | Hetzel | Jan. 29, 1946 |
| 2,416,595 | Reynolds | Feb. 25, 1947 |